United States Patent
Hu et al.

(10) Patent No.: US 10,908,489 B2
(45) Date of Patent: Feb. 2, 2021

(54) LIGHT EMITTING DEVICE AND PROJECTION SYSTEM

(71) Applicant: APPOTRONICS CORPORATION LIMITED, Guangdong (CN)

(72) Inventors: Fei Hu, Guangdong (CN); Zuqiang Guo, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/323,089

(22) PCT Filed: Apr. 21, 2017

(86) PCT No.: PCT/CN2017/081506
§ 371 (c)(1),
(2) Date: Feb. 4, 2019

(87) PCT Pub. No.: WO2018/024000
PCT Pub. Date: Feb. 8, 2018

(65) Prior Publication Data
US 2019/0171094 A1 Jun. 6, 2019

(30) Foreign Application Priority Data
Aug. 4, 2016 (CN) .......................... 2016 1 0633378

(51) Int. Cl.
*G03B 21/20* (2006.01)
(52) U.S. Cl.
CPC .......... *G03B 21/208* (2013.01); *G03B 21/20* (2013.01); *G03B 21/204* (2013.01); *G03B 21/2013* (2013.01); *G03B 21/2066* (2013.01)

(58) Field of Classification Search
CPC .. G03B 21/208; G03B 21/20; G03B 21/2013; G03B 21/204; G03B 21/2066; F21S 10/02; F21S 10/007
See application file for complete search history.

(56) References Cited

U.S. PATENT DOCUMENTS

| 2014/0211169 A1 | 7/2014 | Kitano et al. |
| 2014/0285774 A1 | 9/2014 | Tajiri |

(Continued)

FOREIGN PATENT DOCUMENTS

| CN | 102890398 A | 1/2013 |
| CN | 104460205 A | 3/2015 |

(Continued)

OTHER PUBLICATIONS

International Search Report for International Application No. PCT/CN2017/081506, dated Jul. 20, 2017.

(Continued)

*Primary Examiner* — Anabel Ton
(74) *Attorney, Agent, or Firm* — Marshall, Gerstein & Borun LLP

(57) ABSTRACT

A light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment that reflects the first excitation light to form second excitation light. The light guiding system is further configured to collect the second excitation light and guide the second excitation light to exit via an output light channel. The first excitation light and the second excitation light have non-overlapping light paths.

30 Claims, 15 Drawing Sheets

(56) References Cited

U.S. PATENT DOCUMENTS

| | | |
|---|---|---|
| 2015/0177599 A1 | 6/2015 | Huang |
| 2015/0267880 A1 | 9/2015 | Hadrath et al. |
| 2015/0362830 A1 | 12/2015 | Liao et al. |

FOREIGN PATENT DOCUMENTS

| | | |
|---|---|---|
| CN | 104730830 A | 6/2015 |
| CN | 104820334 A | 8/2015 |
| CN | 105278226 A | 1/2016 |
| CN | 105301879 A | 2/2016 |
| JP | 2015533225 A | 11/2015 |
| WO | WO-2014/109333 A1 | 7/2014 |
| WO | WO-2016/016076 A1 | 2/2016 |

OTHER PUBLICATIONS

Office Action, Japanese patent application No. 2019-505156.
Extended European Search Report for Application No. EP 17836184.6 dated Jan. 23, 2020.
Office Action for Japanese Patent Application No. 2019-505156, dated Oct. 19, 2020.
Office Communication for European Patent Application No. 17836184.6, dated Oct. 21, 2020.

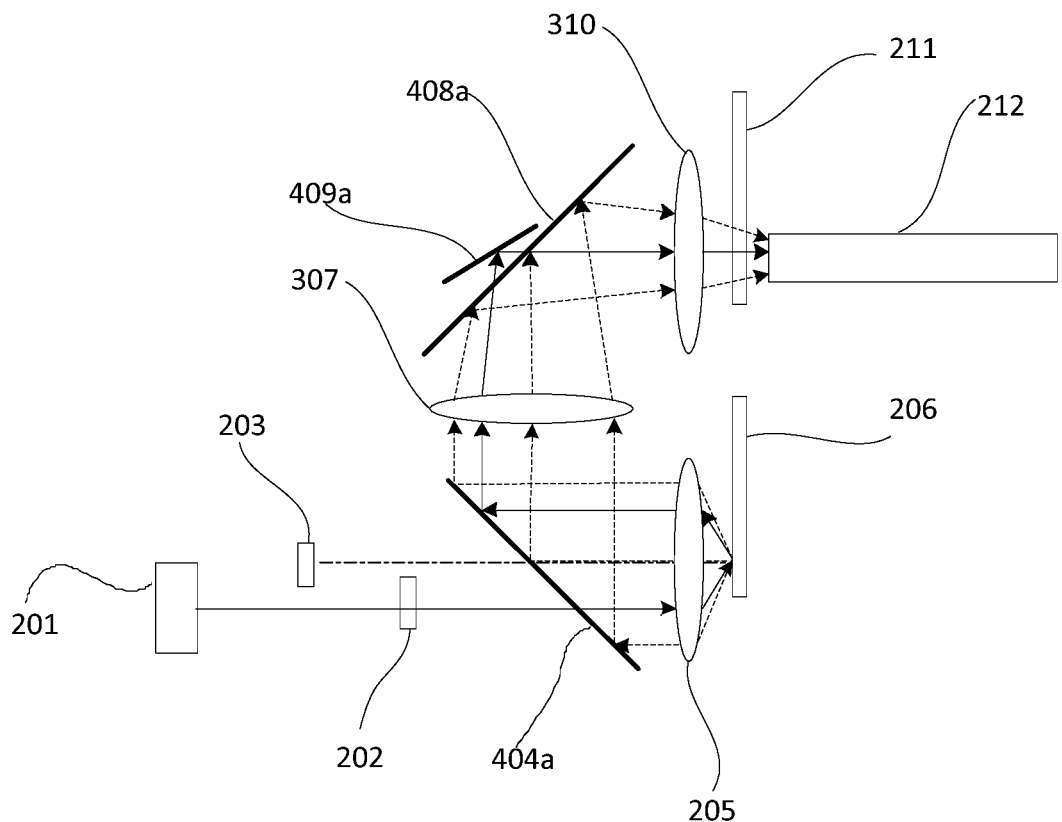
Fig. 4A1
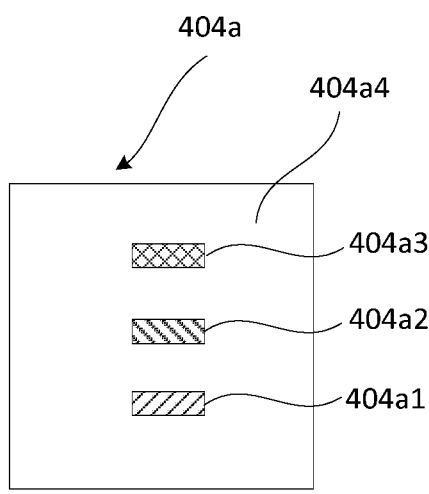
Fig. 4A2

LIGHT EMITTING DEVICE AND PROJECTION SYSTEM

CROSS-REFERENCE TO RELATED APPLICATIONS

This is the United States national phase of International Patent Application No. PCT/CN2017/081506, filed on Apr. 21, 2017, which claims priority to Chinese Patent Application No. 201610633378.4, filed on Aug. 4, 2016, the entire contents of each of which are incorporated herein by reference.

TECHNICAL FIELD

The present disclosure relates to the field of projection technology, and in particular, to a light emitting device and a projection system.

BACKGROUND

Conventionally in the field of projection technology, it is a common practice to use a semiconductor blue laser to excite a phosphor to generate red light and green light, which form light of three primary colors to modulate images along with blue light emitted by the semiconductor blue laser itself.

As shown in FIG. 1, a light source includes a first light source 101, a light homogenizing device 102, a regional light splitter 103, a collection lens 104, a phosphor color wheel 105, a first relay lens 106, a second relay lens 108, a mirror 107 and a square rod 109.

As shown in FIG. 2, the regional light splitter 103 includes a blue-transmissive and yellow-reflective region 1031 in a central region of the regional light splitter 103 and a blue-reflective and yellow-reflective region 1032.

The first light source 101 is a blue laser. The blue light (excitation light) emitted by the blue laser passes through the light homogenizing device 102 so as to be homogenized and then passes through the blue-transmissive and yellow-reflective region 1031 of the regional light splitter 103. The blue light from the first light source enters along a central axis of the collection lens 104. The collection lens 104 gathers the excitation light. The blue light, after being collected by the collection lens 104, is incident on the phosphor color wheel 105. The phosphor color wheel 105 includes a first segment coated with a red phosphor, a second segment coated with a green phosphor and a third segment having a scattering function. The phosphor color wheel 105 rotates periodically such that the first, second and third segments are time-divisionally located in the light path of the blue light. The blue light excites the red phosphor to produce red fluorescence (excited light) and the green phosphor to produce green fluorescence (excited light). The red fluorescence and the green fluorescence are output in form of Lambert light. The blue light, is scattered through the third segment, and is also output in form of Lambert light as well, leading to an increased optical expansion. The red fluorescence and the green fluorescence pass through the collection lens 104 and reflected by the regional light splitter 103. The blue light, is output in form of Lambert light, is only reflected by the blue-reflective and yellow-reflective region 1032. The blue light incident on the blue-transmissive and yellow-reflective region 1031 will be lost due to its transmission. The red light, green light and blue light, passing through the relay lens 106, the mirror 107 and the relay mirror 108, enter the square rod 109 and are finally output from an exit of the square rod 109.

SUMMARY

Technical Problem

Due to lack of blue light in the central portion of the light beam incident on the square rod 109, when the light beam is output from the square rod 109, the distribution of the spot surface at the exit has a phenomenon of color unevenness and the central portion is yellowish, resulting in color unevenness in the final projected image.

In the above technical solution, the regional light splitter 103 transmits and reflects the excitation light by using different amounts of optical expansion of the excitation light and the excited light. Although the area of the blue-transmissive yellow-reflective region 1031 can be set adaptively to be smaller as the optical expansion of the excitation light is smaller, it is inevitable that some of the blue light will be lost.

SOLUTION TO THE PROBLEM

Technical Solutions

In view of the above, a light emitting device is provided, capable of avoiding light loss due to separation of two light beams of the same color by utilizing different optical expansions, thereby avoiding uneven color distribution due to the light loss.

In order to achieve the above object, the following technical solutions are provided.

A light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment that reflects the first excitation light to form second excitation light. The light guiding system is further configured to collect the second excitation light and guide the second excitation light to exit via an output light channel. The first excitation light and the second excitation light have non-overlapping light paths.

In the above light emitting device, the reflecting segment reflects the first excitation light to form second excitation light, without scattering the first excitation light to increase the optical expansion of the second excitation light. Further, the light guiding system guides the second excitation light, along an output light path that does not overlap an incident light path of the first excitation light, to exit via the output light channel. It can avoid separation of the incident light path of the first excitation light and the output light path of the second excitation light by utilizing different optical expansions of the first excitation light and the second excitation light, thereby avoiding loss of part of the second excitation light along the incident light path of the first excitation light. In this way, the light utilization can be improved effectively and uneven color distribution due to the light loss can be avoided.

In an embodiment, the wavelength conversion device further includes a wavelength conversion segment and the wavelength conversion device moves periodically such that the reflecting segment and the wavelength conversion segment are time-divisionally located in the light path of the first excitation light. The wavelength conversion segment is excited by the first excitation light to generate excited light. The light guiding system is configured to collect the excited light and guide the excited light to exit via the output light channel.

In an embodiment, a primary optical axis of the second excitation light output from the wavelength conversion device does not coincide with a primary optical axis of the excited light output from the wavelength conversion device. The light guiding system is further configured to make the primary optical axis of the second excitation light and the primary optical axis of the excited light be parallel with each other and have a distance therebetween smaller than a threshold.

In this embodiment, the primary optical axis of the second excitation light and the primary optical axis of the excited light are parallel with each other and have the distance therebetween smaller than the threshold, which facilitates further processing of the second excitation light and the excited light. For example, when the second excitation light and the excited light are homogenized using a light homogenizing element, this allows the second excitation light and the excited light output from the light homogenizing element to have the same distribution evenness.

In an embodiment, the light guiding system includes a relay lens component and an excitation light guiding component including at least one excitation light guider. The relay lens component is configured to collect the second excitation light and the excited light, such that the second excitation light and the excited light enter the output light channel with a predetermined optical expansion. The excitation light guider is configured to reflect the first excitation light or the second excitation light to change the light path of the first excitation light or the second excitation light, such that the primary optical axis of the second excitation light before entering the output light channel and the primary optical axis of the excited light are parallel with each other and have the distance therebetween smaller than the threshold. The excitation light guider does not change a light path of the excited light.

In an embodiment, the light guiding system further includes an excited light guiding component including at least one excited light guider. The excitation light guider is configured to reflect the first excitation light or the second excitation light to change the light path of the first excitation light or the second excitation light and the excited light guider is configured to reflect the excited light to change the light path of the excited light, such that the primary optical axis of the second excitation light before entering the output light channel and the primary optical axis of the excited light are parallel with each other and have the distance therebetween smaller than the threshold. The excited light guider does not change the light paths of the first excitation light and the second excitation light.

In an embodiment, the excitation light guiding component includes at least one excitation light guider satisfying a condition that the excitation light guider is in the light path of the second excitation light, located at a position where the primary optical axis of the second excitation light it receives and a straight line of a primary optical axis of a segment of the light path of the excited light converge, and configured to reflect the second excitation light it receives, such that the primary optical axis of the second excitation light and the primary optical axis of the segment of the light path of the excited light are parallel with each other and have the distance therebetween smaller than the threshold.

In an embodiment, the excitation light guiding component further includes at least one excitation light guider satisfying a condition that the excitation light guider is configured to reflect the second excitation light it receives, such that the primary optical axis of the second excitation light and the primary optical axis of the excited light have a convergence position.

In an embodiment, the excitation light guiding component further includes at least one excitation light guider satisfying a first condition that the excitation light guider is in the light path of the second excitation light, located at a position where the primary optical axis of the second excitation light it receives and a straight line of a primary optical axis of the excited light as reflected by one excited light guider converge, and configured to reflect the second excitation light it receives, such that the primary optical axis of the second excitation light and the primary optical axis of the excited light are parallel with each other and have the distance therebetween smaller than the threshold.

In an embodiment, in addition to the excitation light guider satisfying the first condition, the excitation light guiding component further includes at least one excitation light guider satisfying a condition that the excitation light guider is configured to reflect the second excitation light it receives, such that the primary optical axis of the second excitation light and a primary optical axis of the excited light as reflected by one excited light guider have a convergence position.

In an embodiment, in addition to the excitation light guider satisfying the first condition and the excited light guider, the excitation light guiding component further includes at least one excitation light guider and the excited light guiding component further includes at least one excited light guider. The excitation light guider and the excited light guider are arranged in a superimposed manner.

In an embodiment, the excitation light guider and the excited light guider arranged in the superimposed manner are replaced with a one-piece regional light splitter including at least a first region and optionally a second region. The first region has a characteristic of reflecting the first excitation light and the second excitation light, and the second region has a characteristic of reflecting the excited light.

In an embodiment, the excitation light guider has a reflection surface whose area satisfies a condition that the area is sufficiently large such that the reflection surface of the excitation light guider can receive and reflect the first excitation light or the second excitation light completely at a specified position, while not affecting transmission of the first excitation light and the second excitation light in other light path segments.

In an embodiment, the first region has a reflection surface whose area satisfies a condition that the area is sufficiently large such that the reflection surface of the first region can receive and reflect the first excitation light or the second excitation light completely at a specified position, while not affecting transmission of the first excitation light and the second excitation light in other light path segments.

In an embodiment, the excitation light guiding component further includes at least one excitation light guider satisfying a condition that the excitation light guider changes a direction of the primary optical axis of the second excitation light, so as to reduce a minimum distance between the primary optical axis of the second excitation light and the primary optical axis of the excited light.

In an embodiment, in addition to the excitation light guider satisfying the first condition and the excited light guider, the excitation light guiding component further includes at least one excitation light guider and the excited light guiding component further includes at least one excited light guider. The excitation light guider and the excited light guider satisfy: a second condition that the excitation light guider is in a light path of the excited light as reflected by one excited light guider and a distance between the primary optical axis of the second excitation light received by the excitation light guider and the primary optical axis of the excited light received by the excited light guider is larger than a distance between the primary optical axis of the second excitation light reflected by the excitation light guider and the primary optical axis of the excited light reflected by the excited light guider, or a third condition that the excitation light guider is in located in a reverse extended path of the light path of the excited light as reflected by one excited light guider and a distance between the primary optical axis of the second excitation light received by the excitation light guider and the primary optical axis of the excited light received by the excited light guider is larger than a distance between the primary optical axis of the second excitation light reflected by the excitation light guider and the primary optical axis of the excited light reflected by the excited light guider.

In an embodiment, the wavelength conversion segment is a reflective wavelength conversion segment and the excited light and the second excitation light are output from one side of the wavelength conversion device. The excitation light guider corresponds, one to one, to the excited light guider. The excitation light guider and the corresponding excited light guider are parallel with each other and have their respective reflection surfaces facing a same direction.

In an embodiment, the light guiding system includes a relay lens component, an excitation light guiding component and an optical axis calibration element. The excitation light guiding component includes at least one excitation light guider. The relay lens component is configured to collect the second excitation light and the excited light, such that the second excitation light and the excited light enter the output light channel with a predetermined optical expansion. The excitation light guider is configured to reflect the first excitation light or the second excitation light and the optical axis calibration element is configured to transmit the second excitation light and calibrate the optical axis of the second excitation light, such that the primary optical axis of the second excitation light before entering the output light channel and the primary optical axis of the excited light are parallel with each other and have the distance therebetween smaller than the threshold. The excitation light guider does not change a light path of the excited light. The optical axis calibration element is not in the light path of the excited light.

In an embodiment, the light guiding system includes a relay lens component, an excitation light guiding component, an optical axis calibration element and an excited light guiding component. The excitation light guiding component includes at least one excitation light guider. The excited light guiding component includes at least one excited light guider. The relay lens component is configured to collect the second excitation light and the excited light, such that the second excitation light and the excited light enter the output light channel with a predetermined optical expansion. The excitation light guider is configured to reflect the first excitation light or the second excitation light, the optical axis calibration element is configured to transmit the second excitation light and calibrate the optical axis of the second excitation light, and the excited light guider is configured to reflect the excited light, such that the primary optical axis of the second excitation light before entering the output light channel and the primary optical axis of the excited light are parallel with each other and have the distance therebetween smaller than the threshold. The excitation light guider does not change a light path of the excited light. The optical axis calibration element is not in the light path of the excited light. The excited light guider does not change the light paths of the first excitation light and the second excitation light.

In an embodiment, the second excitation light and the excited light time-divisionally converge at a position before the output light channel. The optical axis calibration element moves periodically, such that it arrives at the position when the second excitation light is output from the wavelength conversion device and leaves the position when the excited light is output from the wavelength conversion device.

In an embodiment, the wavelength conversion segment is a transmissive wavelength conversion segment and the excited light and the second excitation light are output from different sides of the wavelength conversion device. The optical axis calibration element is in the light path of the second excitation light and not in the light path of the excited light.

In an embodiment, the light guiding system includes a collection lens. The first excitation light is incident on the collection lens in a direction of a non-central axis of the collection lens, such that the collection lens deflects a primary optical axis of the first excitation light and transmits the first excitation light to the wavelength conversion device. The second excitation light output from the wavelength conversion device is transmitted to the collection lens which deflects the primary optical axis of the second excitation light.

In an embodiment, the direction in which the first excitation light is incident on the collection lens is parallel with a direction of a central axis of the collection lens. The focus of the collection lens is located on a reflection surface of the reflection region and the central axis of the collection lens is perpendicular to the reflection surface, such that the light path of the primary optical axis of the second excitation light via the collection lens and the light path of the primary optical axis of the first excitation light via the collection lens is symmetric about the central axis of the collection lens.

In an embodiment, the reflecting segment reflects the first excitation light to form second excitation light, such that the primary optical axis of the second excitation light and the primary optical axis of the excited light are parallel with each other and have the distance therebetween smaller than the threshold.

In an embodiment, the light guiding system further includes a scattering element configured to scatter the second excitation light, such that a scattering angle of the second excitation light is maintained consistent with that of the excited light.

In an embodiment, the second excitation light and the excited light time-divisionally converge at a position before the output light channel. The scattering element moves periodically, such that it arrives at the position when the second excitation light is output from the wavelength conversion device and leaves the position when the excited light is output from the wavelength conversion device.

In an embodiment, the light guiding system further includes a filter wheel including a scattering segment and a transmitting segment. The scattering segment is configured to scatter the second excitation light, such that a scattering angle of the second excitation light is maintained consistent with that of the excited light, and the transmitting segment is configured to transmit the excited light. The second excitation light and the excited light time-divisionally converge at a position before the output light channel, and the filter wheel is provided at the position. The filter wheel rotates periodically, such that the scattering segment is in the light path of the second excitation light when the second excitation light is output from the wavelength conversion device and that the transmitting segment is in the light path of the excited light when the excited light is output from the wavelength conversion device.

In an embodiment, the wavelength conversion device and the filter wheel are arranged coaxially and driven by a driving device to rotate around the same rotation axis.

In an embodiment, the reflecting segment and the wavelength conversion segment form a first circular ring, and the scattering segment and the transmitting segment form a second circular ring. A center of the first circular ring and a center of the second circular ring are both on the rotation axis. The reflecting segment and the scattering segment are arranged in two opposite sectors having the same central angles, and the wavelength conversion segment and the transmitting segment are arranged in two opposite sectors having the same central angles. A spot on the wavelength conversion device where the first excitation light is projected and spots on the filter wheel where the second excitation light and the excited light are projected, respectively, can be passed through by a same plane that passes through the rotation axis.

In an embodiment, the optical expansion of the first excitation light and the second excitation light is smaller than the optical expansion of the excited light.

In an embodiment, the light emitting device further includes a light homogenizing element. The output light channel is formed within the light homogenizing element. The light homogenizing element is configured to homogenize the second excitation light and the excited light.

In an embodiment, the relay lens component is configured to collect the second excitation light and the excited light, such that the second excitation light and the excited light form images on an incident surface of the light homogenizing element with a predetermined spot size.

In an embodiment, the primary optical axis of the second excitation light and the primary optical axis of the excited light being parallel with each other and having the distance therebetween smaller than the threshold include the primary optical axis of the second excitation light and the primary optical axis of the excited light coinciding.

In an embodiment, the light emitting device further includes a second light source configured to emit compensation light when the wavelength conversion segment of the wavelength conversion device is in the light path of the first excitation light. The light guiding system is further configured to guide the compensation light to the wavelength conversion device. The compensation light is scattered by the wavelength conversion segment of the wavelength conversion device and then output from one side of the wavelength conversion device along with the excited light. The light guiding system is further configured to guide the excited light to exit via the output light channel.

In an embodiment, the compensation light and the excited light have overlapping wavelength ranges.

In an embodiment, the scattered compensation light is transmitted via a same light path as the excited light.

In an embodiment, the primary optical axis of the compensation light output from the wavelength conversion device and the primary optical axis of the excited light output from the wavelength conversion device are parallel with each other and have a distance therebetween smaller than a threshold.

In an embodiment, the first light source is configured to emit primary color light and the second light source is configured to emit excitation light. The wavelength conversion device moves periodically, and the first light source and the second light source are turned on and off in accordance with the periodic movement of the wavelength conversion device, such that the reflecting segment of the wavelength conversion device is in a light path of the primary color light when the first light source is emitting the primary color light so as to reflect the primary color light and that the reflecting segment of the wavelength conversion device is in a light path of the excitation light when the second light source is emitting the excitation light so as to generate the excited light. Before the primary color light enters the wavelength conversion device, the light guiding system guides the primary color light in the same way it guides the first excitation light. After the primary color light is output from the wavelength conversion device, the light guiding system guides the primary color light in the same way it guides the second excitation light.

In an embodiment, the light guiding system includes an excitation light guiding component which includes at least one excitation light guider. The excitation light guider is configured to reflect the first excitation light or the second excitation light to change the light path of the first excitation light or the second excitation light, such that the light path of the first excitation light and the light path of the second excitation light do not overlap.

In an embodiment, the light guiding system further includes a relay lens component configured to collect the second excitation light, such that the second excitation light enters the output light channel with a predetermined optical expansion.

In an embodiment, the relay lens component is further configured to collect the first excitation light, such that the second excitation light is projected to the wavelength conversion device with a predetermined spot size.

In an embodiment, the light guiding system further includes at least one optical axis calibration element configured to transmit the second excitation light and change a direction of the primary optical axis of the second excitation light. With the combined effect of the excitation light guiding component and the optical axis calibration element, the light path of the first excitation light and the light path of the second excitation light do not overlap.

A projection system is also provided by the present disclosure. The projection system includes the light emitting device according to any of the above embodiments.

BRIEF DESCRIPTION OF DRAWINGS

In order to explain the solutions according to the embodiments of the present disclosure or the related art more clearly, the figures used in the description of the embodiments or the related art will be introduced briefly below. Obviously, the following figures only illustrate some of the embodiments of the present disclosure. Other figures can be obtained by those having ordinary skill in the art from these figures without any inventive efforts. In the figures:

FIG. 4A1 is a schematic diagram showing a structure of a light emitting device according to an embodiment;

FIG. 4A2 is a schematic diagram showing a structure of a regional light splitter 404a according to an embodiment;

DESCRIPTION OF EMBODIMENTS

In the following, the solutions according to the embodiments of the present disclosure will be described clearly and fully with reference to the figures. Obviously, the embodiments described below are only some, rather than all, of the embodiments of the present disclosure. All other embodiments that can be obtained by those skilled in the art from the embodiments described below without any inventive efforts, or any feasible solutions obtained by combining a part or all of features from two or more embodiments according to the present disclosure, are to be encompassed by the scope of the present disclosure.

First Part of Embodiments

Figure 2A:
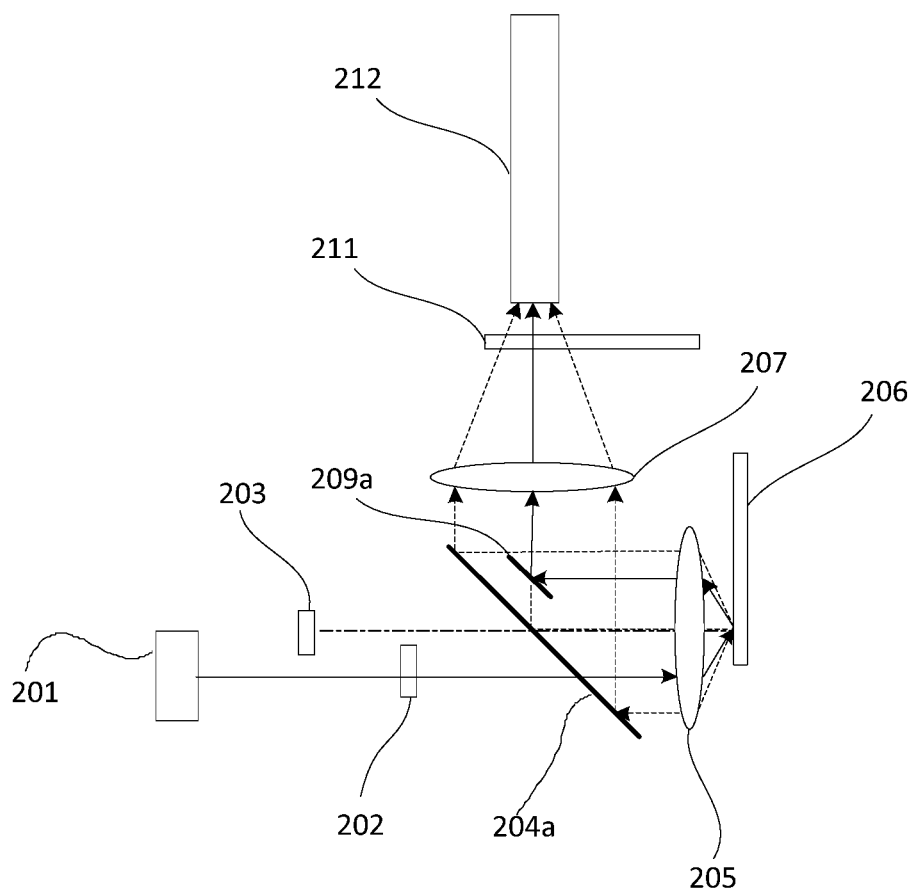
FIG. 2A is a schematic diagram showing a structure of a light emitting device according to an embodiment.

As shown in FIG. 2A, in an embodiment, a light emitting device includes: a first light source 201, a light homogenizing device 202, a second light source 203, an excited light guider 204a, a collection lens 205, a wavelength conversion device 206, a first relay lens 207, an excitation light guider 209a, a filter wheel 211 and a light homogenizing element 212.

The first light source 201 emits first excitation light, which is homogenized by the light homogenizing device 202, transmitted through the excited light guider 204a, incident on and collected by the collection lens 205, and transmitted to the wavelength conversion device 206. In an embodiment, the first light source 201 can be a blue laser or a blue laser array and the first excitation light can be a blue laser light. In another embodiment, the first light source 201 can be a blue Light Emitting Diode (LED) and the first excitation light can be blue LED light. The present disclosure is not limited to any of these embodiments.

The wavelength conversion device 206 includes a reflecting segment and a wavelength conversion segment. The wavelength conversion device 206 moves periodically such that the reflecting segment and the wavelength conversion segment are time-divisionally located in the light path of the first excitation light. The reflecting segment reflects the first excitation light to form second excitation light. The wavelength conversion segment is excited by the first excitation light to generate excited light. The second excitation light, as reflected by the reflecting segment, is collected by the collection lens 205 and transmitted to the excitation light guider 209a, which reflects the second excitation light to the first relay lens 207. The excited light, once generated, is collected by the collection lens 206 and transmitted to the excited light guider 204a. The excitation light guider 209a has a characteristic of transmitting the excited light, such that the transmission of the excited light is not affected by the excitation light guider 209a. The excited light guider 204a reflects the excited light to the first relay lens 207. The first relay lens 207 time-divisionally collects the second excitation light and the excited light and time-divisionally transmits the second excitation light and the excited light to the filter wheel 211. Here, the second excitation light reflected by the excitation light guider 209a has its primary optical axis coinciding with the primary optical axis of the excited light.

In the present disclosure, a primary optical axis of a light beam can be a central axis of the light beam and the direction of the primary optical axis can be the direction in which the light beam travels.

In the present disclosure, the primary optical axis of the second excitation light coinciding with the primary optical axis of the excited light may mean that they coincide substantially, rather than absolutely. It can be understood by those skilled in the art that, starting from the solution according to the present disclosure, a solution in which the primary optical axis of the second excitation light and the primary optical axis of the excited light are parallel with each other and have a distance therebetween smaller than a threshold is also to be encompassed by the scope of the present disclosure.

In this embodiment, the excitation light guider 209a is in the light path of the excited light reflected by the excited light guider 204a. The primary optical axis of the second excitation light received by the excitation light guider 209a and the primary optical axis of the excited light reflected by the excited light guider 204a converge on the reflection surface of the excitation light guider 209a. The excitation light guider 209a reflects the second excitation light it receives in the direction of the primary optical axis of the excited light reflected by the excited light guider 204a, such that the primary optical axis of the second excitation light coincides with the primary optical axis of the excited light.

In the present disclosure, the primary optical axis of the second excitation light and the primary optical axis of the excited light converging on the reflection surface of the excitation light guider 209a may mean that the incident point at which the primary optical axis of the second excitation light is incident on the reflection surface of the excitation light guider 209a is close to the incident point at which the primary optical axis of the excited light is incident on the reflection surface of the excitation light guider 209a, e.g., the distance between them is smaller than a threshold.

The area of the reflection surface of the excitation light guider 209a satisfies a condition that the area is sufficiently large such that the reflection surface of the excitation light guider 209a can receive and reflect the second excitation light completely at a specified position (i.e., the position at which the primary optical axis of the second excitation light received by the excitation light guider 209a and the primary optical axis of the excited light reflected by the excited light guider 204a converge), without preventing the first excitation light from being incident on the collection lens 205. In an embodiment, the area of the reflection surface of the excitation light guider 209a can be adapted to the size of the spot on which the second excitation light it receives is projected on it, i.e., the area can match the spot, e.g., equal to the area of the spot, such that the second excitation light can be reflected completely.

The filter wheel 211 includes a scattering segment and a transmitting segment. The scattering segment is configured to scatter the second excitation light, such that a scattering angle of the second excitation light is maintained consistent with that of the excited light, and the transmitting segment is configured to transmit the excited light.

The filter wheel 211 rotates periodically, such that the scattering segment is in the light path of the second excitation light when the second excitation light is output from the wavelength conversion device 206 and that the transmitting segment is in the light path of the excited light when the excited light is output from the wavelength conversion device 206.

The second excitation light and the excited light, output from the filter wheel 211, form images on an incident surface of the light homogenizing element 212 with a predetermined spot size. The output light channel is formed within the light homogenizing element 212. The light homogenizing element 212 is configured to homogenize the second excitation light and the excited light.

In this embodiment, the second light source 203 is configured to emit compensation light when the wavelength conversion segment of the wavelength conversion device 206 is in the light path of the first excitation light. The excited light guider 204a has regionalized transmission characteristics for the compensation light. It includes a compensation-transmissive region capable of transmitting the compensation light and a remaining region having a characteristic of reflecting the compensation light. The areas of the compensation-transmissive region and the remaining region can be set in accordance with a predetermined proportion. In an embodiment, the area of the compensation-transmissive region can be set to be smaller than the area of the remaining region. The compensation light transmitted through the compensation-transmissive region is incident on and collected by the collection lens 205 and then transmitted to the wavelength conversion device 206. The wavelength conversion segment is provided with a wavelength conversion material for receiving the first excitation light to generate the excited light. The wavelength conversion material has a scattering effect for the compensation light. The scattered compensation light and the excited light are transmitted via the same light path to enter the light homogenizing element 212. During transmission of the compensation light, the optical processes applied by the respective optical elements to the compensation light are the same as those applied to the excited light. For example, the transmitting segment of the filter wheel 211 can transmit the compensation light as well. In an embodiment, the primary optical axis of the compensation light output from the wavelength conversion device 206 coincides with the primary optical axis of the excited light output from the wavelength conversion device 206.

In an embodiment, the compensation light and the excited light have overlapping wavelength ranges. For example, the wavelength range of the compensation light can be (a, b) and the wavelength range of the excited light can be (c, d), where $c<b<d$. In an embodiment, the color of the compensation light may be the same as or similar to that of the excited light. The compensation light may compensate for at least one of hue and brightness of the excited light.

In another embodiment, when the excited light needs no compensation, the second light source 203 for emitting the compensation light may be omitted. The present disclosure is not limited to this. When the second light source 203 for emitting the compensation light is omitted, the excited light guider 204a may not include the above compensation-transmissive region.

In an embodiment, the optical expansion of each of the first excitation light and the second excitation light is smaller than the optical expansion of the excited light.

Second Part of Embodiments

Figure 2B:
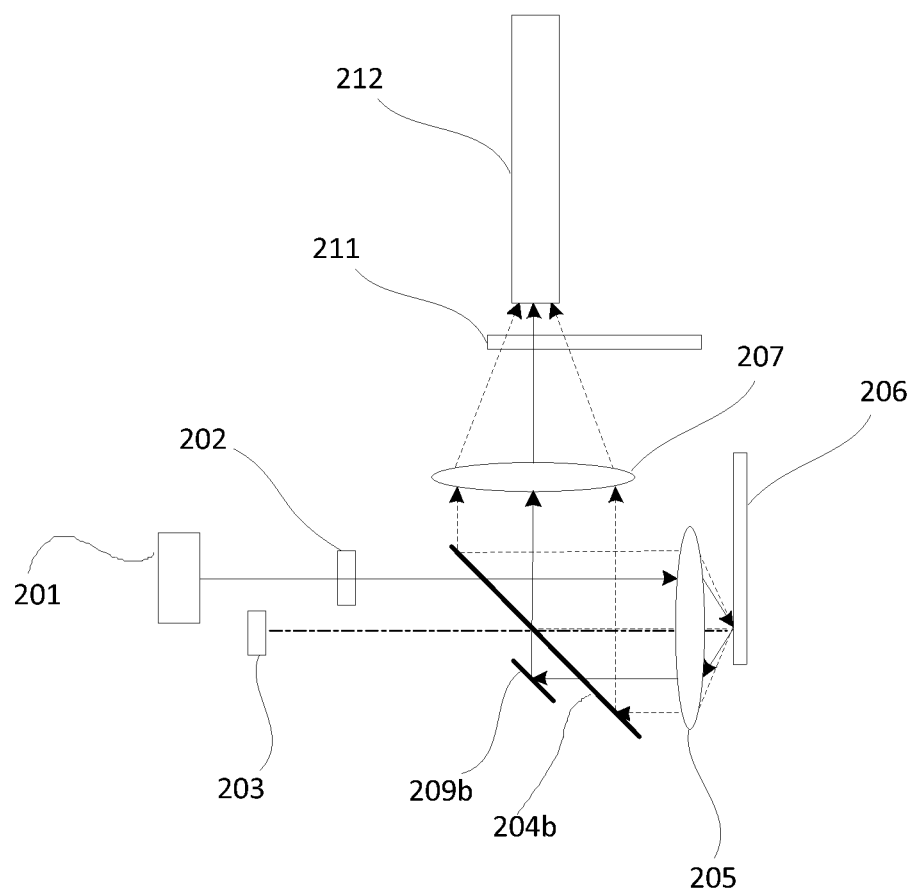
FIG. 2B is a schematic diagram showing a structure of a light emitting device according to an embodiment.

As shown in FIG. 2B, in an embodiment, a light emitting device includes: a first light source 201, a light homogenizing device 202, a second light source 203, an excited light guider 204b, a collection lens 205, a wavelength conversion device 206, a first relay lens 207, an excitation light guider 209b, a filter wheel 211 and a light homogenizing element 212.

It differs from the embodiment shown in FIG. 2A in that the second excitation light, as collected by the collection lens 205, is transmitted through the excited light guider 204b, further incident on and reflected by the excitation light guider 209b, and then transmitted to the first relay lens 207.

The excitation light guider 209b is located in the reverse extension path of the light path of the excited light reflected by the excited light guider 204b. The primary optical axis of the second excitation light received by the excitation light guider 209b and a reverse extension line of the primary optical axis of the excited light reflected by the excited light guider 204b converge on the reflection surface of the excitation light guider 209b. The excitation light guider 209b reflects the second excitation light it receives in the direction of the primary optical axis of the excited light reflected by the excited light guider 204b, such that the primary optical axis of the second excitation light coincides with the primary optical axis of the excited light.

In the present disclosure, the primary optical axis of the second excitation light and the reverse extension line of the primary optical axis of the excited light converging on the reflection surface of the excitation light guider 209b, may mean that the incident point at which the primary optical axis of the second excitation light is incident on the reflection surface of the excitation light guider 209b is close to the intersection point between the reverse extension line of the primary optical axis of the excited light and the reflection surface of the excitation light guider 209b, e.g., the distance between them is smaller than a threshold.

For the functions and characteristics of the respective optical elements and the transmissions and optical processes of the light beams that are not described in this embodiment, reference can be made to the first part of embodiments and details thereof will be omitted here.

Third Part of Embodiments

Figure 2C:
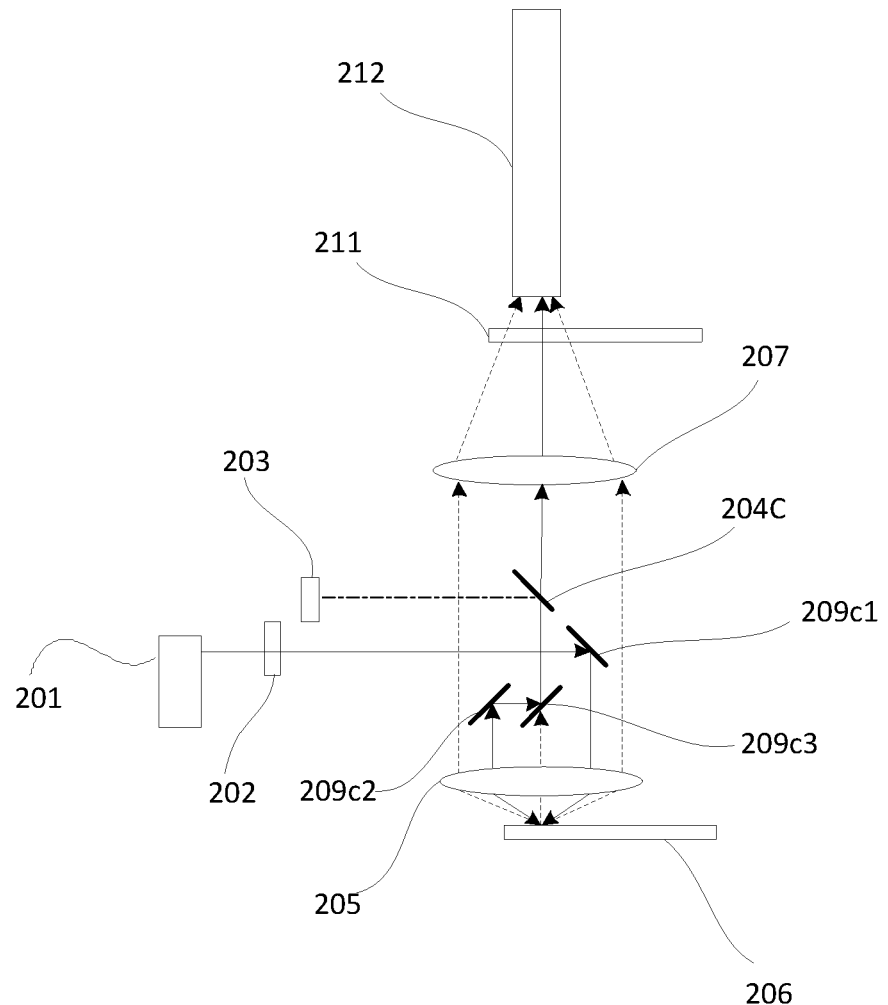
FIG. 2C is a schematic diagram showing a structure of a light emitting device according to an embodiment.

As shown in FIG. 2C, in an embodiment, a light emitting device includes: a first light source 201, a light homogenizing device 202, a second light source 203, a compensation light guider 204c, a collection lens 205, a wavelength conversion device 206, a first relay lens 207, an excitation light guider 209c1, an excitation light guider 209c2, an excitation light guider 209c3, a filter wheel 211 and a light homogenizing element 212.

It differs from the embodiment shown in FIG. 2A in that the first excitation light is homogenized by the light homogenizing device 202 and reflected by the excitation light guider 209c1 to the collection lens 205.

The excited light output from the collection lens 205 is further collected by the first relay lens 207. The excitation light guider 209c1, the excitation light guider 209c2 and the excitation light guider 209c3 do not affect transmission of the excited light. In this embodiment, each of the excitation light guider 209c1, the excitation light guider 209c2 and the excitation light guider 209c3 has a characteristic of transmitting the excited light, and the compensation light guider 204c has a characteristic of reflecting the compensation light. When the compensation light and the excited light have overlapping wavelength ranges, the compensation light guider 204c will reflect a part of the excited light, such that the part of the excited light will be lost.

The second excitation light output from the collection lens 205 is reflected by the excitation light guider 209c2 to the excitation light guider 209c3. The excitation light guider 209c3 is in the light path of the excited light. The primary optical axis of the second excitation light received by the excitation light guider 209c3 and the primary optical axis of the excited light converge on the reflection surface of the excitation light guider 209c3. The excitation light guider 209c3 reflects the second excitation light it receives in the direction of the primary optical axis of the excited light, such that the primary optical axis of the second excitation light coincides with the primary optical axis of the excited light. The compensation light guider 204c has a characteristic of transmitting the second excitation light and does not affect the transmission of the second excitation light.

The area of the reflection surface of the excitation light guider 209c1 satisfies a condition that the area is sufficiently large such that the reflection surface of the excitation light guider 209c1 can receive and reflect the first excitation light completely at a specified position, without preventing the second excitation light from being incident on the first relay lens 207. In an embodiment, the area of the reflection surface of the excitation light guider 209c1 can be adapted to the size of the spot on which the first excitation light it receives is projected on it, i.e., the area can match the spot, such that the first excitation light can be reflected completely. Similarly, the excitation light guider 209c2 does not prevent the second excitation light output from the excitation light guider 209c3 from being transmitted to the second relay lens 207, or prevent the first excitation light from being transmitted to the excitation light guider 209c1. The compensation light emitted by the second light source 203 is reflected by the compensation light guider 204c and then collected by the collection lens 205. The excitation light guider 209c1, the excitation light guider 209c2 and the excitation light guider 209c3 do not affect the transmission of the compensation light. In this embodiment, each of the excitation light guider 209c1, the excitation light guider 209c2 and the excitation light guider 209c3 has a characteristic of transmitting the compensation light.

In some embodiments, when the second light source 203 is omitted, the compensation light guider 204c can be omitted accordingly.

In an embodiment, the compensation light guider 204c and the excitation light guider 209c1 are replaced with a one-piece regional light splitter including a first region and a second region. The first region functions as the compensation light guider 204c and has the same optical characteristics as the compensation light guider 204c. The second region functions as the excitation light guider 209c1 and has the same optical characteristics as the excitation light guider 209c1. Optionally, the regional light splitter may further include a third region connecting the first region and the second region and capable of transmitting the excited light.

For the functions and characteristics of the respective optical elements and the transmissions and optical processes of the light beams that are not described in this embodiment, reference can be made to the first part of embodiments and details thereof will be omitted here.

Fourth Part of Embodiments

Figure 2D:
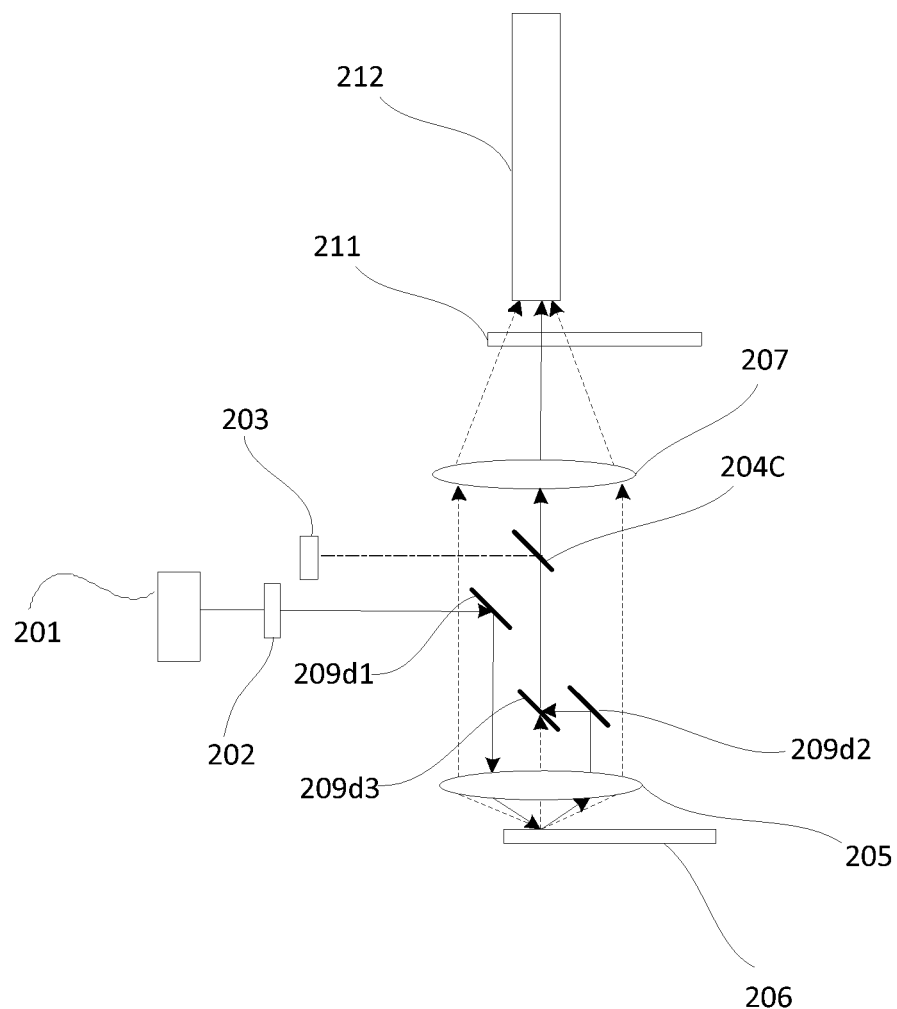
FIG. 2D is a schematic diagram showing a structure of a light emitting device according to an embodiment.

As shown in FIG. 2D, in an embodiment, a light emitting device includes: a first light source 201, a light homogenizing device 202, a second light source 203, a compensation light guider 204c, a collection lens 205, a wavelength conversion device 206, a first relay lens 207, an excitation light guider 209d1, an excitation light guider 209d2, an excitation light guider 209d3, a filter wheel 211 and a light homogenizing element 212.

It differs from the embodiment shown in FIG. 2C in that the first excitation light is homogenized by the light homogenizing device 202 and reflected by the excitation light guider 209d1 to the collection lens 205.

The second excitation light output from the collection lens 205 is reflected by the excitation light guider 209d2 to the excitation light guider 209d3. The excitation light guider 209d3 is in the light path of the excited light. The primary optical axis of the second excitation light received by the excitation light guider 209d3 and the primary optical axis of the excited light converge on the reflection surface of the excitation light guider 209d3. The excitation light guider 209d3 reflects the second excitation light it receives in the direction of the primary optical axis of the excited light, such that the primary optical axis of the second excitation light coincides with the primary optical axis of the excited light. The excitation light guider 209d1, the excitation light guider 209d2 and the excitation light guider 209d3 do not affect transmission of the excited light and the compensation light. In this embodiment, each of the excitation light guider 209d1, the excitation light guider 209d2 and the excitation light guider 209d3 has a characteristic of transmitting the excited light and the compensation light.

In an embodiment, the output position of the second light source 203 as shown in FIG. 2D can be moved downwards, and the excitation light guider 209d1, the compensation light guider 204c and the excitation light guider 209d2 can be on the same plane. In an embodiment, the excitation light guider 209d1, the compensation light guider 204c and the excitation light guider 209d2 that are on the same plane can be replaced with a one-piece regional light splitter including a first region, a second region and a third region. The first region functions as the excitation light guider 209d1 and has the same optical characteristics as the excitation light guider 209d1. The second region functions as the compensation light guider 204c and has the same optical characteristics as the compensation light guider 204c. The third region functions as the excitation light guider 209d2 and has the same optical characteristics as the excitation light guider 209d2. Optionally, the regional light splitter may further include a fourth region connecting the first region, the second region and the third region, and capable of transmitting the excited light.

For the functions and characteristics of the respective optical elements and the transmissions and optical processes of the light beams that are not described in this embodiment, reference can be made to the third part of embodiments and details thereof will be omitted here.

Fifth Part of Embodiments

In the embodiments shown in FIGS. 2A-2D, the first excitation light is incident on the collection lens 205 in a direction of a non-central axis of the collection lens 205. The collection lens 205 deflects the primary optical axis of the first excitation light and transmits the first excitation light to the wavelength conversion device 206. The second excitation light output from the wavelength conversion device 206 is transmitted to the collection lens 205 which deflects the primary optical axis of the second excitation light.

Here, the first excitation light is incident on the collection lens 205 in a direction parallel with a direction of a central axis of the collection lens 205. The collection lens 205 has a focus at a reflection surface of the reflection region of the wavelength conversion device 206 and the central axis of the collection lens 205 is perpendicular to the reflection surface. The light path of the primary optical axis of the second excitation light via the collection lens 205 and the light path of the primary optical axis of the first excitation light via the collection lens 205 is symmetric about the central axis of the collection lens 205. However, the present disclosure is not limited to this.

Figure 2E:
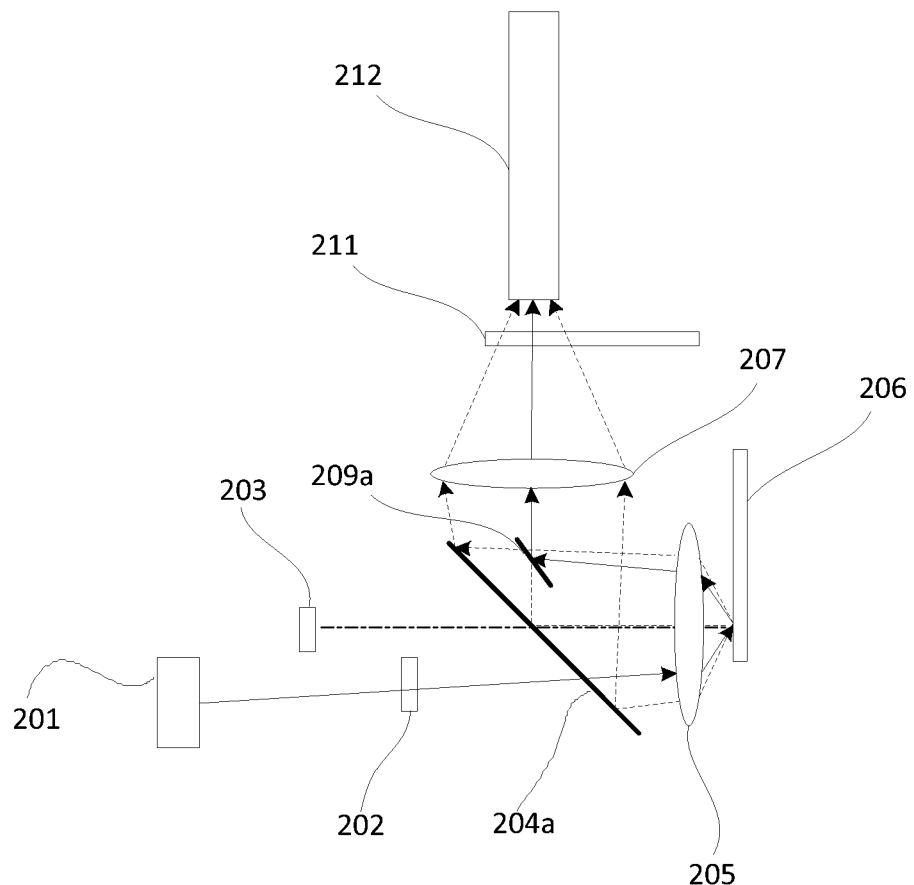
FIG. 2E is a schematic diagram showing a structure of a light emitting device according to an embodiment.

In another embodiment, as shown in FIG. 2E, the direction of the first excitation light incident on the collection lens 205 may not be parallel with the direction of the central axis of the collection lens 205. The focus of the collection lens 205 may not be located on the reflection surface of the reflection region of the wavelength conversion device 206.

In the embodiments shown in FIGS. 2A-2D, the compensation light emitted by the second light source 203 is incident on the collection lens 205 via the central axis of the collection lens 205 and maintained in that direction to be incident on the wavelength conversion device 206. Then the compensation light and the first excitation light converge at the wavelength conversion device 206. The compensation light is scattered by the wavelength conversion material provided on the wavelength conversion segment of the wavelength conversion device 206 to be output in form of Lambert light. The excited light is also output in form of Lambert light. The primary optical axis of the excited light coincides with the primary optical axis of the scattered compensation light.

In another embodiment, the compensation light emitted by the second light source 203 can be incident on the collection lens 205 in the direction of the non-central axis of the collection lens 205. The present disclose is not limited to this.

Figure 2F:
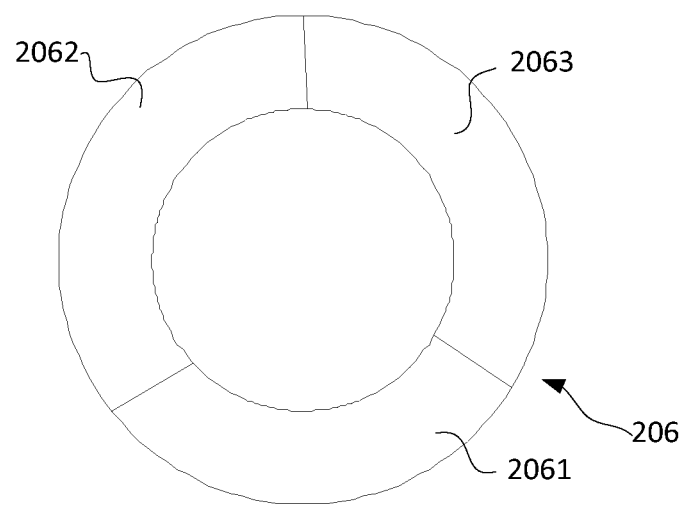
FIG. 2F is a schematic diagram showing a structure of a wavelength conversion device 206 according to an embodiment.

FIG. 2F is a schematic diagram showing a structure of the wavelength conversion device 206 according to an embodiment. Here, the wavelength conversion device 206 has a circular disk structure and includes a reflecting segment 2061, a red light wavelength conversion segment 2062 and a green light wavelength conversion segment 2063. The reflecting segment 2061, the red light wavelength conversion segment 2062 and the green light wavelength conversion segment 2063 form a circular ring. The wavelength conversion device 206 rotates periodically, such that the reflecting segment 2061, the red light wavelength conversion segment 2062 and the green light wavelength conversion segment 2063 are time-divisionally located in the light path of the first excitation light. The reflecting segment 2061 reflects the first excitation light to form the second excitation light. The red light wavelength conversion segment 2062 is excited by the first excitation light to generate a red excited light. The green light wavelength conversion segment 2063 is excited by the first excitation light to generate a green excited light.

Figure 2G:
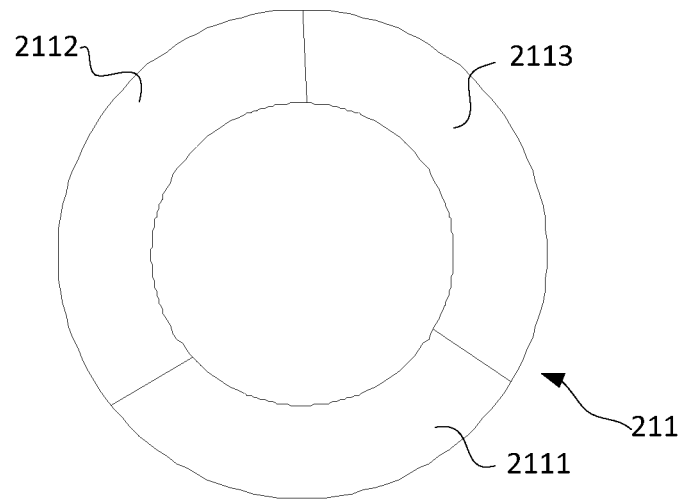
FIG. 2G is a schematic diagram showing a structure of a filter wheel 211 according to an embodiment.

FIG. 2G is a schematic diagram showing a structure of a filter wheel 211 according to an embodiment. Here, the filter wheel 211 has a circular disk structure and includes a scattering segment 2111, a red light transmitting segment 2112 and a green light transmitting segment 2113. The scattering segment 2111, the red light transmitting segment 2112 and the green light transmitting segment 2113 form a circular ring. The scattering segment 2111 scatters the second excitation light, such that a scattering angle of the second excitation light is maintained consistent with those of the red excited light and the green excited light. The red light transmitting segment 2112 transmits the red excited light. The green light transmitting segment 2113 transmits the green excited light. The filter wheel 211 rotates periodically, such that the scattering segment 2111 is in the light path of the second excitation light when the second excitation light is output from the wavelength conversion device 206, the red light transmitting segment 2112 is in the light path of the red excited light when the red excited light is output from the wavelength conversion device 206, and the green light transmitting segment 2113 is in the light path of the green excited light when the green excited light is output from the wavelength conversion device 206.

In another embodiment, the wavelength conversion device 206 may not have the circular disk structure. Instead of forming the circular ring, the reflecting segment 2061, the red light wavelength conversion segment 2062 and the green light wavelength conversion segment 2063 can be arranged in strips on the wavelength conversion device 206. The filter wheel 211 may not have the circular disk structure. Instead of forming the circular ring, the scattering segment 2111, the red light transmitting segment 2112 and the green light transmitting segment 2113 can be arranged in strips on the filter wheel 211. In addition, the present disclosure is not limited to the color of each excited light, and each excited light may have another color such as yellow, magenta, cyan or the like.

Sixth Part of Embodiments

Figure 3:
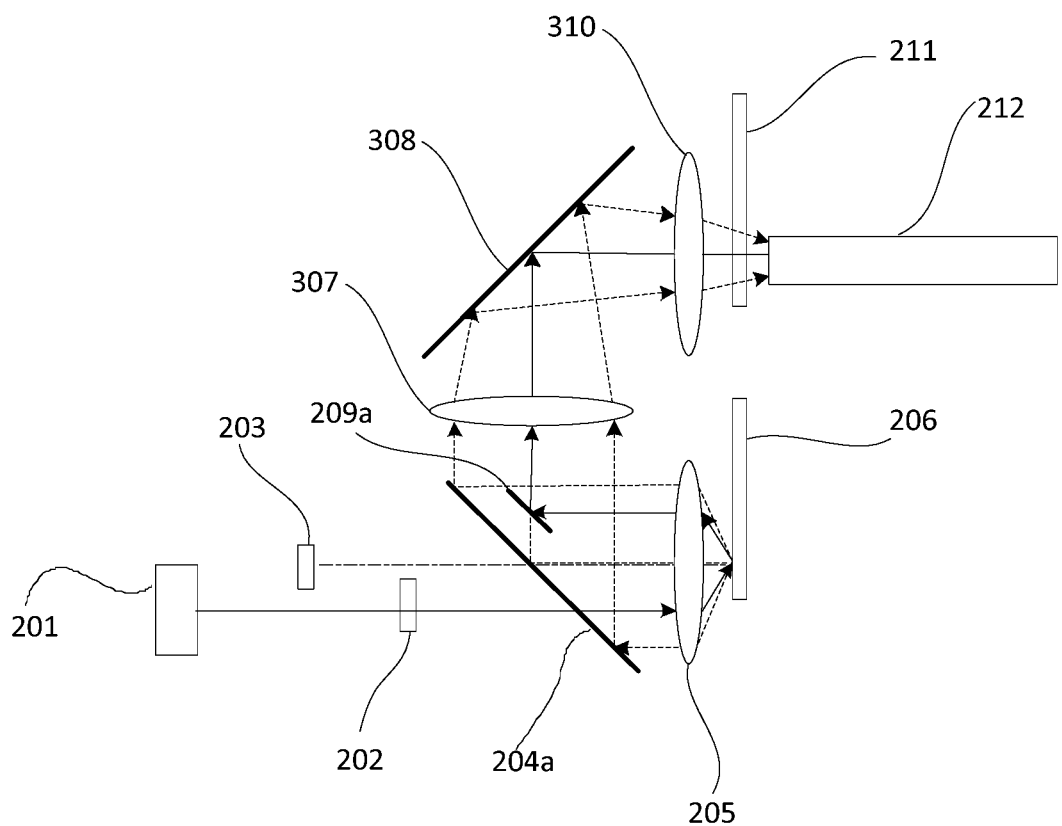
FIG. 3 is a schematic diagram showing a structure of a light emitting device according to an embodiment.

As shown in FIG. 3, in an embodiment, a light emitting device includes: a first light source 201, a light homogenizing device 202, a second light source 203, an excited light guider 204a, a collection lens 205, a wavelength conversion device 206, a first relay lens 307, an excitation light guider 209a, a reflecting element 308, a second relay lens 310, a filter wheel 211 and a light homogenizing element 212.

It differs from the embodiment shown in FIG. 2A in that the first relay lens 307 transmits the second excitation light and the excited light it collects to the reflecting element 308, which in turn reflects them to the second relay lens 310. The second relay lens 310 collects the second excitation light and the excited light and transmits them to the filter wheel 211.

For the functions and characteristics of the respective optical elements and the transmissions and optical processes of the light beams that are not described in this embodiment, reference can be made to the first part of embodiments and details thereof will be omitted here.

The modifications made in the sixth part of embodiments to the first part of embodiments are also applicable to the second to fifth parts of embodiments and details thereof will be omitted here.

Seventh Part of Embodiments

Figure 1A:
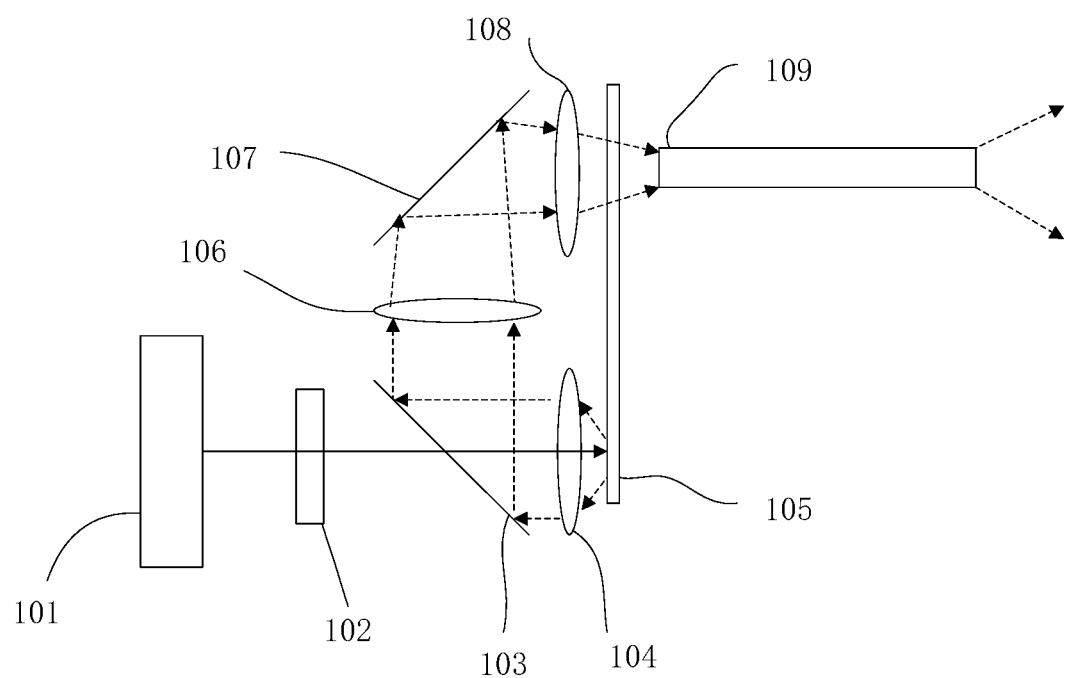
FIG. 1A is a schematic diagram showing a structure of a light emitting device in the related art.
Figure 1B:
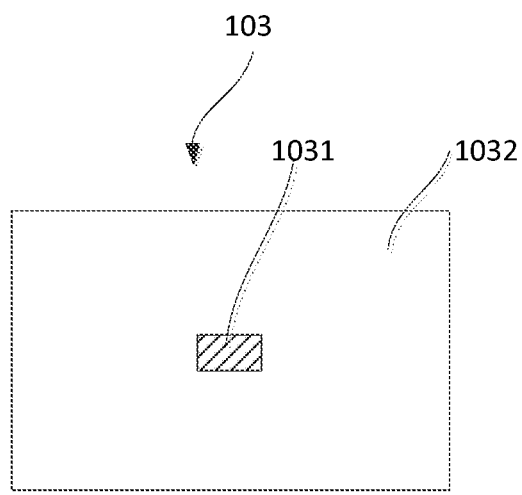
FIG. 1B is a schematic diagram showing a structure of a regional light splitter of a light emitting device in the related art.

As shown in FIG. 4A1, in an embodiment, a light emitting device includes: a first light source 201, a light homogenizing device 202, a second light source 203, a regional light splitter 404a, a collection lens 205, a wavelength conversion device 206, a first relay lens 307, an excitation light guider 409a, an excited light guider 408a, a second relay lens 310, a filter wheel 211 and a light homogenizing element 212.

Here, as shown in FIG. 4A2, the regional light splitter 404a includes a first region 404a1, a compensation-transmissive region 404a2, a third region 404a3 and a fourth region 404a4. The first region 404a1 has a characteristic of transmitting the first excitation light and reflecting the excited light and the compensation light. The compensation-transmissive region 404a2 has a characteristic of transmitting the compensation light. When the compensation light and the excited light have overlapping wavelength ranges, the compensation-transmissive region 404a2 further transmits a part of the excited light in the overlapping wavelength range. The present disclosure is not limited to the transmission characteristic of the compensation-transmissive region 404a2 for the part of the excited light outside the overlapping wavelength range. In an example, the compensation-transmissive region 404a2 may reflect the part of the excited light outside the overlapping wavelength range. The third region 404a3 has a characteristic of reflecting the second excitation light, the excited light and the compensation light. The fourth region 404a4 has a characteristic of reflecting the excited light and the compensation light. The present disclosure is not limited to the transmission characteristic of the fourth region 404a4 for the first excitation light and the second excitation light. When the fourth region 404a4 has a characteristic of transmitting the first excitation light, it can be combined with the first region 404a1 into one region. When then fourth region 404a4 has a characteristic of reflecting the first excitation light, it can be combined with the third region 404a3 into one region.

The area of the reflection surface of the third region 404a3 satisfies a condition that the area is sufficiently large such that the reflection surface of the third region 404a3 can receive and reflect the second excitation light completely, without preventing the first excitation light from being incident on the collection lens 205. In an embodiment, the area of the reflection surface of the third region 404a3 can be adapted to the size of the spot on which the second excitation light it receives is projected on it, i.e., the area can match the spot, e.g., equal to the area of the spot, such that the second excitation light can be reflected completely.

The first excitation light is homogenized by the light homogenizing device 202, further transmitted through the first region 404a1, incident on and collected by the collection lens 205, and transmitted to the wavelength conversion device 206.

The second excitation light, output from the collection lens 205, is reflected by the third region 404a3 to the first relay lens 307, collected by the first relay lens 307 and transmitted to the excitation light guider 409a, further reflected by the excitation light guider 409a to the second relay lens 310, collected by the second relay lens 310 and transmitted to the filter wheel 211. Here, the excited light guider 408a does not affect the transmission of the second excitation light and has a characteristic of transmitting the second excitation light.

The excited light, output from the collection lens 205, is reflected by the regional light splitter 404a to the first relay lens 307. Here, at least a part of the excited light incident on the compensation-transmissive region 404a2 of the regional light splitter 404a that is in the overlapping wavelength ranges of the excited light and the compensation light will be lost due to transmission. In an embodiment, the compensation-transmissive region 404a2 also has a characteristic of reflecting the part of the excited light outside the wavelength range overlapping with that of the compensation light, such that the part of the excited light outside the wavelength range overlapping with that of the compensation light can be reflected by the compensation-transmissive region 404a2 and thus be utilized. The first relay lens 307 transmits the collected excited light to the excited light guider 408a, which further reflects the excited light to the second relay lens 310. The second relay lens 310 further collects the excited light and transmits it to the filter wheel 211.

Here, the excitation light guider 409a is located in the reverse extension path of the light path of the excited light reflected by the excited light guider 408a. The primary optical axis of the second excitation light received by the excitation light guider 409a and the reverse extension line of the primary optical axis of the excited light reflected by the excited light guider 408a converge on the reflection surface of the excitation light guider 409a. The excitation light guider 409a reflects the second excitation light it receives in the direction of the primary optical axis of the excited light reflected by the excited light guider 408a, such that the primary optical axis of the second excitation light coincides with the primary optical axis of the excited light.

The compensation light emitted by the second light source 203 is transmitted through the compensation-transmissive region 404a2 of the regional light splitter 404a, incident on and collected by the collection lens 205, and transmitted to the wavelength conversion device 206. Further, the compensation light is scattered by the wavelength conversion material provided on the wavelength conversion segment of the wavelength conversion device 206. The scattered compensation light is transmitted in the same light path as the excited light to enter the light homogenizing element 212. During transmission of the compensation light, the optical processes applied by the respective optical elements to the compensation light are the same as those applied to the excited light.

In an embodiment, when the second light source 203 is omitted, the compensation-transmissive region 404a2 of the regional light splitter 404a can be omitted accordingly.

In this embodiment, only the differences between the embodiment shown in FIG. 4A1 and the first to seventh parts of embodiments are described. For the functions and characteristics of the respective optical elements and the transmissions and optical processes of the light beams that are not described in this embodiment, reference can be made to the first to sixth parts of embodiments and details thereof will be omitted here.

Eighth Part of Embodiments

Figure 4B:
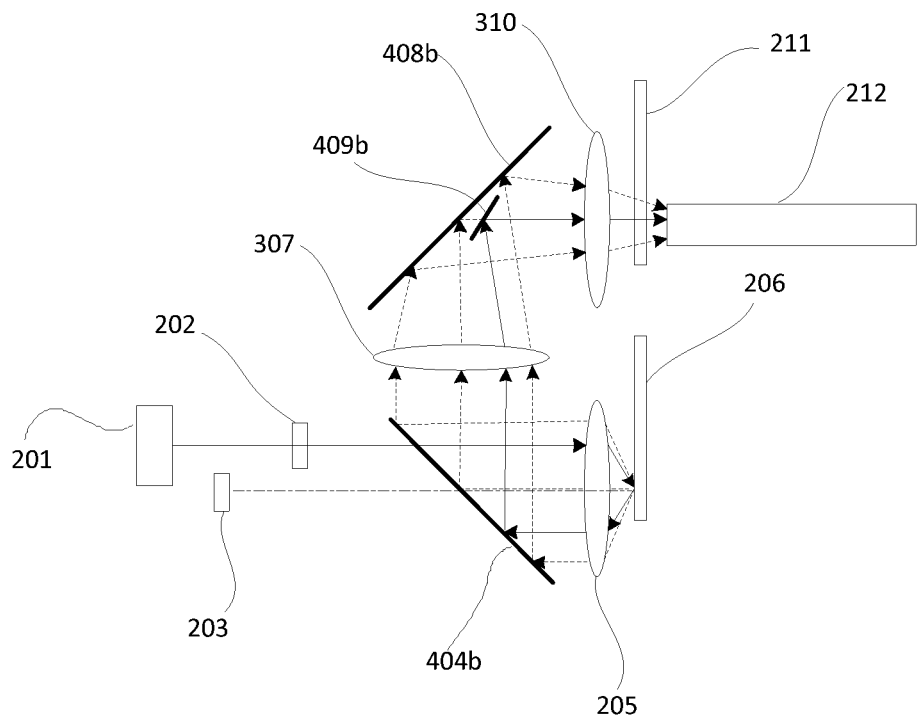
FIG. 4B is a schematic diagram showing a structure of a light emitting device according to an embodiment.

As shown in FIG. 4B, in an embodiment, a light emitting device includes: a first light source 201, a light homogenizing device 202, a second light source 203, a regional light splitter 404b, a collection lens 205, a wavelength conversion device 206, a first relay lens 307, an excitation light guider 409b, an excited light guider 408b, a second relay lens 310, a filter wheel 211 and a light homogenizing element 212.

In this embodiment, the regional light splitter 404a, the excitation light guider 409a and the excited light guider 408a in the embodiment shown in FIG. 4A1 are replaced with the regional light splitter 404b, the excitation light guider 409b and the excited light guider 408b.

Here, like the regional light splitter 404a, the regional light splitter 404b includes a first region 404a1, a compensation-transmissive region 404a2, a third region 404a3 and a fourth region 404a4. The transmission characteristics of the respective regions for the first excitation light, the second excitation light, the excited light and the compensation light are the same as those of the regional light splitter 404a. The regional light splitter 404b differs from the regional light splitter 404a in that, in the regional light splitter 404b, the first region 404a1 is farther from the collection lens 205 than the third region 404a3; whereas in the regional light splitter 404a, the first region 404a1 is closer to the collection lens 205 than the third region 404a3.

The second excitation light is collected by the first relay lens 307 and transmitted to the excitation light guider 409b. The excitation light guider 409b is in the light path of the excited light reflected by the excited light guider 408b. The primary optical axis of the second excitation light received by the excitation light guider 409b and the primary optical axis of the excited light reflected by the excited light guider 408b converge on the reflection surface of the excitation light guider 409b. The excitation light guider 409b reflects the second excitation light it receives in the direction of the primary optical axis of the excited light reflected by the excited light guider 408b, such that the primary optical axis of the second excitation light coincides with the primary optical axis of the excited light.

Like the excited light guider 408a, the excited light guider 408b has a characteristic of reflecting the excited light. However, the present disclosure is not limited to the transmission characteristic of the excited light guider 408b for the second excitation light. The excited light guider 408b can have a characteristic of transmitting or reflecting the second excitation light, or transmitting or reflecting a part of the second excitation light, etc.

For the functions and characteristics of the respective optical elements and the transmissions and optical processes of the light beams that are not described in this embodiment, reference can be made to the seventh part of embodiments and details thereof will be omitted here.

Ninth Part of Embodiments

Figure 4C:
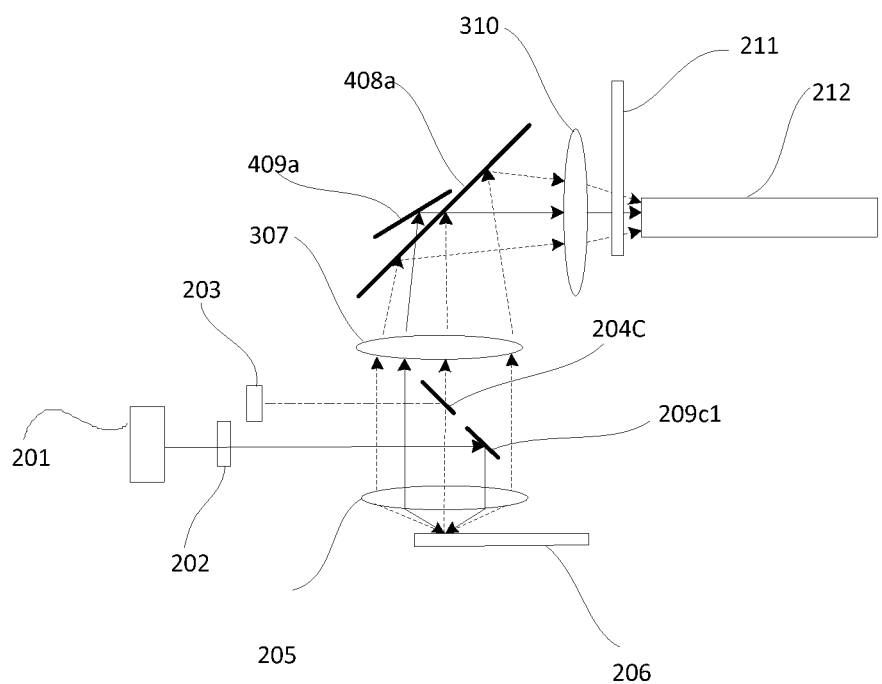
FIG. 4C is a schematic diagram showing a structure of a light emitting device according to an embodiment.

As shown in FIG. 4C, in an embodiment, a light emitting device includes: a first light source 201, a light homogenizing device 202, a second light source 203, a compensation light guider 204c, a collection lens 205, a wavelength conversion device 206, a first relay lens 307, an excited light guider 408a, an excitation light guider 209c1, an excitation light guider 409a, a second relay lens 310, a filter wheel 211 and a light homogenizing element 212.

For the functions and characteristics of the respective optical elements and the transmissions and optical processes of the light beams that are not described in this embodiment, reference can be made to the third and seventh parts of embodiments and details thereof will be omitted here.

Tenth Part of Embodiments

Figure 4D:
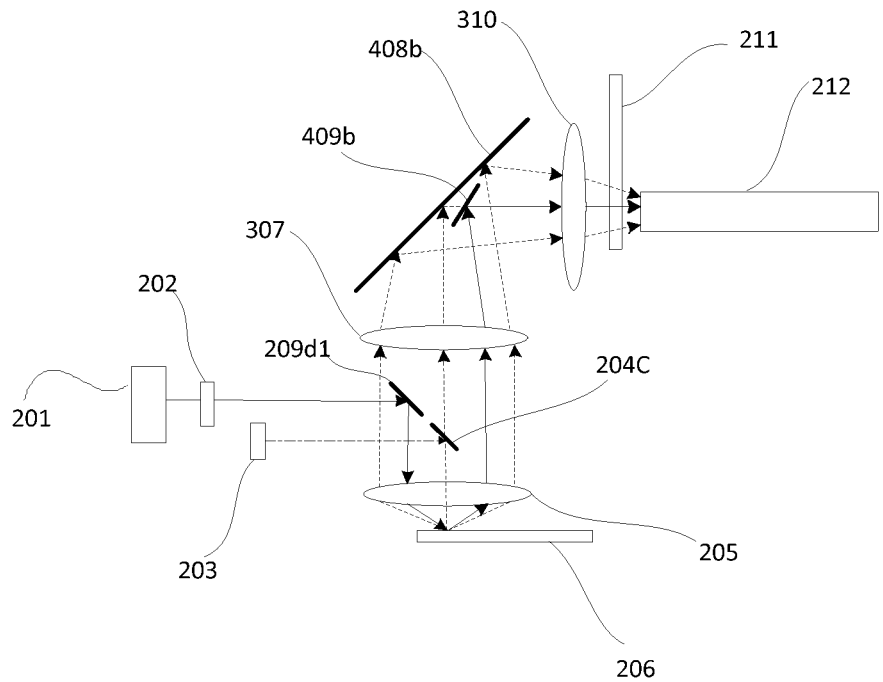
FIG. 4D is a schematic diagram showing a structure of a light emitting device according to an embodiment.

As shown in FIG. 4D, in an embodiment, a light emitting device includes: a first light source 201, a light homogenizing device 202, a second light source 203, a compensation light guider 204c, a collection lens 205, a wavelength conversion device 206, a first relay lens 307, an excited light guider 408b, an excitation light guider 209d1, an excitation light guider 409b, a second relay lens 310, a filter wheel 211 and a light homogenizing element 212.

For the functions and characteristics of the respective optical elements and the transmissions and optical processes of the light beams that are not described in this embodiment, reference can be made to the fourth and eighth parts of embodiments and details thereof will be omitted here.

Eleventh Part of Embodiments

Figure 4E:
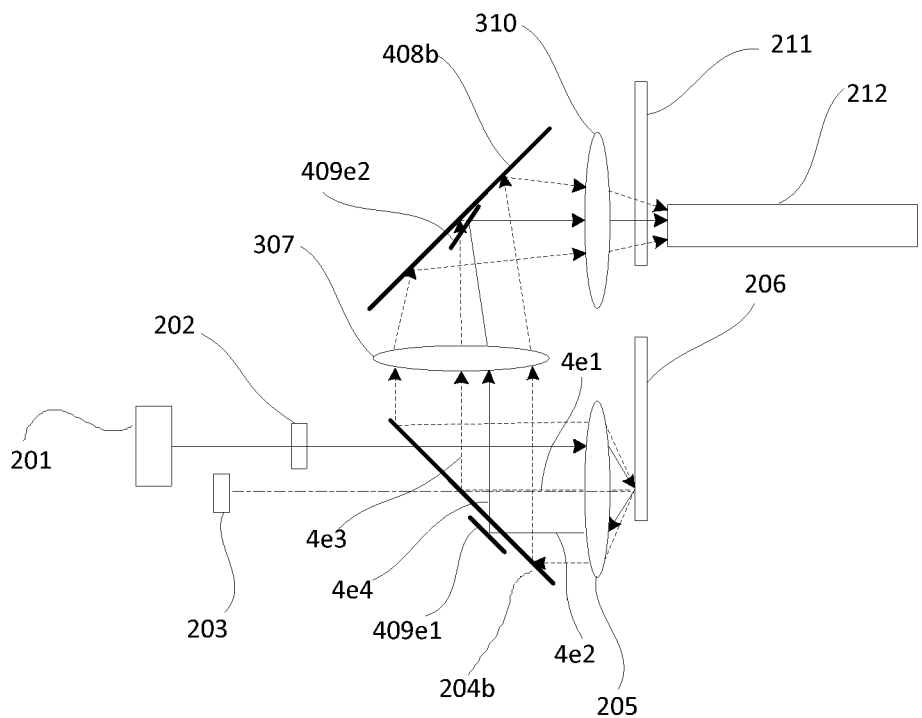
FIG. 4E is a schematic diagram showing a structure of a light emitting device according to an embodiment.

As shown in FIG. 4E, in an embodiment, a light emitting device includes: a first light source 201, a light homogenizing device 202, a second light source 203, an excited light guider 204b, a collection lens 205, a wavelength conversion device 206, a first relay lens 307, an excited light guider 408b, an excitation light guider 409e1, an excitation light guider 409e2, a second relay lens 310, a filter wheel 211 and a light homogenizing element 212.

Here, the second excitation light is collected by the collection lens 205, transmitted through the excited light guider 204b, incident on and reflected by the excitation light guider 409e1, and transmitted to the first relay lens 307.

The excitation light guider 409e1 is located in the reverse extension path of the light path of the excited light reflected by the excited light guider 204b. The distance between the primary optical axis 4e2 of the second excitation light received by the excitation light guider 409e1 and the primary optical axis 4e1 of the excited light received by the excited light guider 204b is larger than the distance between the primary optical axis 4e4 of the second excitation light received by the excitation light guider 409e1 and the primary optical axis 4e3 of the excited light reflected by the excited light guider 204b, such that, in the transmission process, the primary optical axes of the second excitation light and the excited light become closer.

The functions of the excitation light guider 409e2 are the same as those of the excitation light guider 409b. The excitation light guider 409e2 differs from the excitation light guider 409b only in that they have different angles with respect to the primary optical axis of the excited light reflected by the excited light guider 408b. The incident angle of the second excitation light on the excitation light guider 409e2 is different from the incident angle of the second excitation light on the excited light guider 408b. Accordingly, in order to reflect the second excitation light in the direction of the primary optical axis of the excited light reflected by the excited light guider 408b, they have different angles with respect to the primary optical axis of the excited light reflected by the excited light guider 408b. Here, the angle of the excitation light guider 409e2 with respect to the primary optical axis of the excited light reflected by the excited light guider 408b is the angle between the line perpendicular to the reflection surface of the excitation light guider 409e2 and the primary optical axis of the excited light reflected by the excited light guider 408b.

For the functions and characteristics of the respective optical elements and the transmissions and optical processes of the light beams that are not described in this embodiment, reference can be made to the second and eighth parts of embodiments and details thereof will be omitted here.

Twelfth Part of Embodiments

Figure 5A:
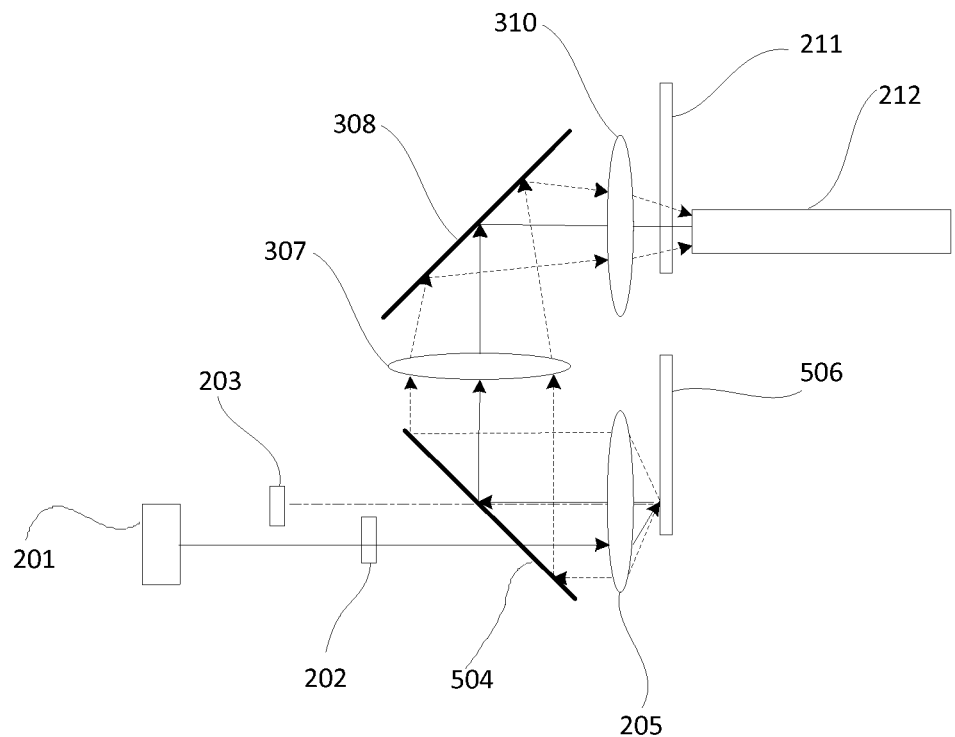
FIG. 5A is a schematic diagram showing a structure of a light emitting device according to an embodiment.

As shown in FIG. 5A, in an embodiment, a light emitting device includes: a first light source 201, a light homogenizing device 202, a second light source 203, a regional light splitter 504, a collection lens 205, a wavelength conversion device 506, a first relay lens 307, a reflecting element 308, a second relay lens 310, a filter wheel 211 and a light homogenizing element 212.

It differs from the embodiment shown in FIG. 3 as follows.

Figure 5B:
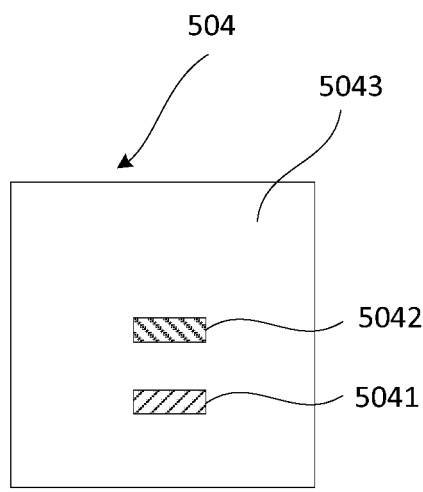
FIG. 5B is a schematic diagram showing a structure of a regional light splitter 504 according to an embodiment.

As shown in FIG. 5B, the regional light splitter 504 includes a first region 5041, a second region 5042 and a third region 5043. The first region 5041 has a characteristic of transmitting the first excitation light and reflecting the excited light and the compensation light. The second region 5042 has a characteristic of transmitting the compensation light and reflecting the second excitation light. When the compensation light and the excited light have overlapping wavelength ranges, the second region 5042 further transmits a part of the excited light in the overlapping wavelength range. The present disclosure is not limited to the transmission characteristic of the second region 5042 for the part of the excited light outside the overlapping wavelength range. In an example, the second region 5042 may reflect the part of the excited light outside the overlapping wavelength range. The third region 5043 has a characteristic of reflecting the excited light and the compensation light. The present disclosure is not limited to the transmission characteristic of the third region 5043 for the first excitation light and the second excitation light. When the third region 5043 has a characteristic of transmitting the first excitation light, it can be combined with the first region 5041 into one region.

The first excitation light is transmitted through the first region 5041 of the regional light splitter 504, collected by the collection lens 205, and transmitted to the wavelength conversion device 506.

The wavelength conversion device 506 differs from the wavelength conversion device 206 in that the primary optical axis of the second excitation light formed by the reflecting segment of the wavelength conversion device 506 reflecting the first excitation light coincides with the primary optical axis of the excited light output from the wavelength conversion device 506.

Figure 5C:
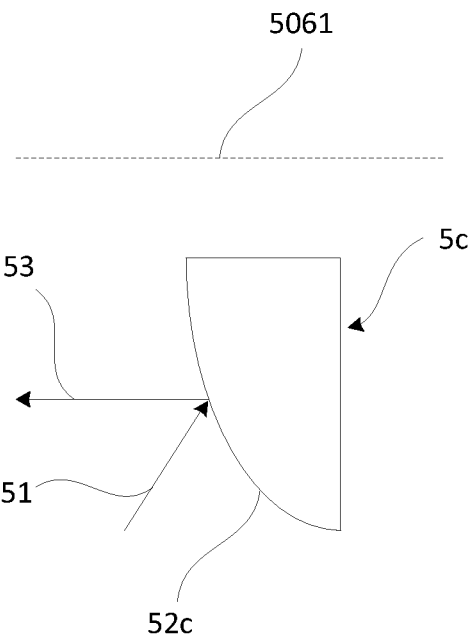
FIG. 5C is a schematic diagram showing a radial section of a reflecting segment according to an embodiment.
Figure 5D:
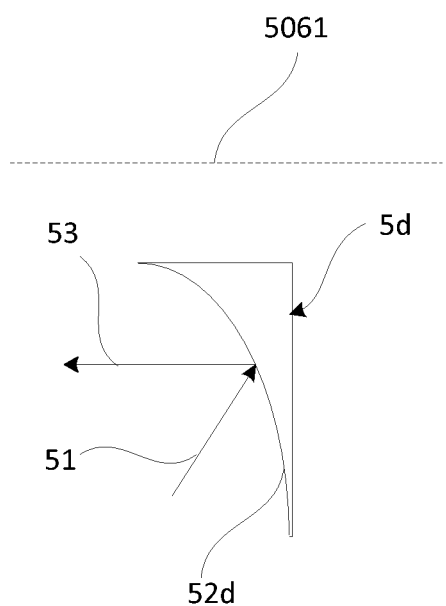
FIG. 5D is a schematic diagram showing a radial section of a reflecting segment according to an embodiment.
Figure 5E:
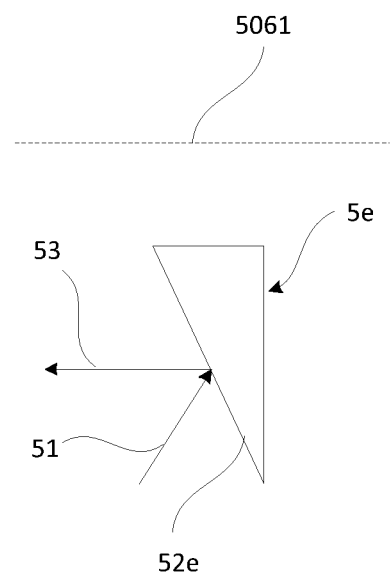
FIG. 5E is a schematic diagram showing a radial section of a reflecting segment according to an embodiment.

In an example where the wavelength conversion device 506 has a circular disk structure and its reflecting segment and the wavelength conversion segment form a circular ring, the reflecting segment and the wavelength conversion segment rotates around the central axis of the wavelength conversion device 506. FIGS. 5C-5E are schematic diagrams each showing the radial section of the reflecting segment. This radial section can be understood as a section obtained by cutting the reflecting segment through a plane passing through the central axis of the wavelength conversion device 506. Accordingly, the three-dimensional profile of the reflecting segment of the wavelength conversion device 506 can be obtained by rotating the shapes 5c, 5d and 5e shown in FIGS. 5C, 5D and 5E about the central axis 5061 of the wavelength conversion device 506 by a predetermined angle.

As shown in FIGS. 5C, 5D and 5E, the first excitation light 51 is reflected by the reflection surfaces 52c, 52d and 52e to form the second excitation light 53. The primary optical axis of the second excitation light 53 coincides with the primary optical axis of the excited light output from the wavelength conversion segment of the wavelength conversion device 506. Here, the reflection surfaces 52c, 52d and 52e are convex, concave and flat, respectively. However, the present disclosure is not limited to this. Any reflection surfaces capable of reflecting the first excitation light to form the second excitation light having the primary optical axis coinciding with that of the excited light are to be encompassed by the scope of the present disclosure.

As the primary optical axis of the second excitation light output from the wavelength conversion device 506 coincides with the primary optical axis of the excited light output from the wavelength conversion device 506, the excitation light guider 209a is omitted in the embodiment shown in FIG. 5A, as compared with the embodiment shown in FIG. 3.

For the functions and characteristics of the respective optical elements and the transmissions and optical processes of the light beams that are not described in this embodiment, reference can be made to the sixth part of embodiments and details thereof will be omitted here.

Thirteenth Part of Embodiments

Figure 6:
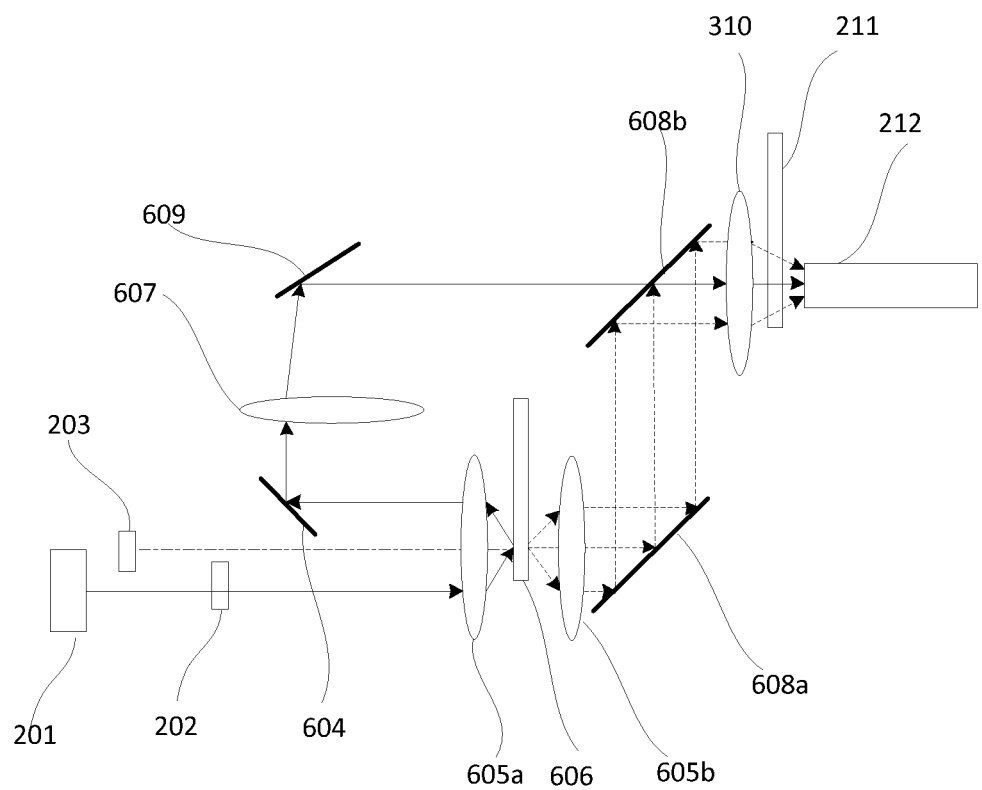
FIG. 6 is a schematic diagram showing a structure of a light emitting device according to an embodiment.

As shown in FIG. 6, in an embodiment, a light emitting device includes: a first light source 201, a light homogenizing device 202, a second light source 203, an excitation light guider 604, a collection lens 605a, a collection lens 605b, a wavelength conversion device 606, a first relay lens 607, an excited light guider 608a, an excited light guider 608b, an excitation light guider 609, a second relay lens 310, a filter wheel 211 and a light homogenizing element 212.

This embodiment differs from the sixth part of embodiments mainly in that, in the sixth part of embodiments, the wavelength conversion segment of the wavelength conversion device is a reflective wavelength conversion segment and the excited light and the second excitation light are output from one side of the wavelength conversion device; whereas in this embodiment, the wavelength conversion segment of the wavelength conversion device 606 is a transmissive wavelength conversion segment and the excited light and the second excitation light are output from different sides of the wavelength conversion device 606.

In this embodiment, the first excitation light emitted by the first light source 201 is homogenized by the light homogenizing element 212, incident on and collected by the collection lens 605a, and transmitted to the wavelength conversion device 606. The reflecting segment of the wavelength conversion device 606 reflects the first excitation light to form the second excitation light, which is further collected by the collection lens 605a and transmitted to the excitation light guider 604. The excitation light guider 604 reflects the second excitation light to the first relay lens 607. The second excitation light is further collected by the first relay lens 607 and transmitted to the excitation light guider 609. The excitation light guider 609 reflects the second excitation light to the second relay lens 310. The excited light guider 608a does not affect the transmission of the second excitation light and has a characteristic of transmitting the second excitation light.

The wavelength conversion segment of the wavelength conversion device 606 receives the first excitation light and is excited to generate the excited light. The excited light is collected by the collection lens 605b and incident on and reflected by the excited light guider 608a to the excited light guider 608b. The excited light is further reflected by the excited light guider 608b to the second relay lens 310, which collects the second excitation light and the excited light, and transmits them to the filter wheel 211.

Here, the primary optical axis of the second excitation light entering the light homogenizing element 212 coincides with the primary optical axis of the excited light entering the light homogenizing element.

For the functions and characteristics of the respective optical elements and the transmissions and optical processes of the light beams that are not described in this embodiment, reference can be made to the sixth part of embodiments and details thereof will be omitted here.

Fourteenth Part of Embodiments

In an embodiment, the filter wheel in the light emitting device according to the first to thirteenth parts of embodiments can be replaced with a scattering element configured to scatter the second excitation light, such that a scattering angle of the second excitation light entering the light homogenizing element 212 is maintained consistent with that of the excited light entering the light homogenizing element 212. In some embodiments where the light homogenizing element 212 is omitted, the scattering element is configured to scatter the second excitation light, such that a scattering angle of the second excitation light entering an output light channel is maintained consistent with that of the excited light entering the output light channel.

In an embodiment, the scattering element can be provided in a light channel both the second excitation light and the excited light pass through, e.g., at the position of the filter wheel as shown in FIGS. 2A-2E, 3, 4A1, 4B-4E, 5A and 6. In this embodiment, the scattering element moves periodically to scatter the second excitation light, without scattering the excited light.

In an embodiment, the second excitation light and the excited light time-divisionally converge at a position before the output light channel. The scattering element moves periodically, such that it arrives at the position when the second excitation light is output from the wavelength conversion device and leaves the position when the excited light is output from the wavelength conversion device.

In another embodiment, the scattering element can be arranged in a light channel the second excitation light passes through but the excited light does not, e.g., in a light path of the second excitation light between the collection lens 605a and the excited light guider 608b as shown in FIG. 6.

Fifteenth Part of Embodiments

In the above parts of embodiments, the second excitation light is reflected by an optical element (e.g., the excitation light guider 209a in FIG. 2A, the regional light splitter 404a and the excitation light guider 409a in FIG. 4A1, the regional light splitter 404b and the excitation light guider 409b in FIG. 4B, or the like), such that the direction of its primary optical axis is changed and its primary optical axis coincides with the primary optical axis of the excited light.

In an embodiment, with a combined effect of an excitation light guider and an optical axis calibration element, the direction of the primary optical axis of the second excitation light is changed, such that the primary optical axis of the second excitation light coincides with the primary optical axis of the excited light. Here, the excitation light guider reflects the first excitation light or the second excitation light such that the direction of the primary optical axis of the first excitation light or the second excitation light is changed. The excitation light guider does not affect the transmission of the excited light. The optical axis calibration element transmits the second excitation light and changes the direction of its primary optical axis.

The design of the light paths of the light emitting device in this embodiment can be obtained by improving the structure shown in any of FIGS. 2A-2E, 3, 4A1, 4B-4E, 5A and 6. In an embodiment, an optical axis calibration element can be added to the light emitting device shown in any of FIGS. 2A-2E, 3, 4A1, 4B-4E, 5A and 6.

In an embodiment, the optical axis calibration element can be provided in a light channel both the second excitation light and the excited light pass through, e.g., at the position close to the filter wheel as shown in FIGS. 2A-2E, 3, 4A1, 4B-4E, 5A and 6. In this embodiment, the optical axis calibration element moves periodically to change the direction of the primary optical axis of the second excitation light, without changing the direction of the primary optical axis of the excited light. In an embodiment, the second excitation light and the excited light time-divisionally converge at a position before the output light channel. The optical axis calibration element moves periodically, such that it arrives at the position when the second excitation light is output from the wavelength conversion device and leaves the position when the excited light is output from the wavelength conversion device.

In another embodiment, the optical axis calibration element can be arranged in a light channel the second excitation light passes through but the excited light does not, e.g., in a light path of the second excitation light between the collection lens 605a and the excited light guider 608b as shown in FIG. 6. Here, the wavelength conversion segment of the wavelength conversion device 606 is a transmissive wavelength conversion segment and the excited light and the second excitation light are output from different sides of the wavelength conversion device 606. The optical axis calibration element is in the light path of the second excitation light, but not in the light path of the excited light.

In an embodiment, the optical axis calibration element can be arranged close to the scattering segment of the filter wheel in the above embodiment or the scattering element in the above embodiment. In an embodiment, the optical axis calibration element can be superimposed on and fixed to the scattering segment of the filter wheel in the above embodiment or the scattering element in the above embodiment. In an embodiment, the second excitation light is processed by the optical axis calibration element first, and then by the scattering segment or the scattering element.

Figure 7:
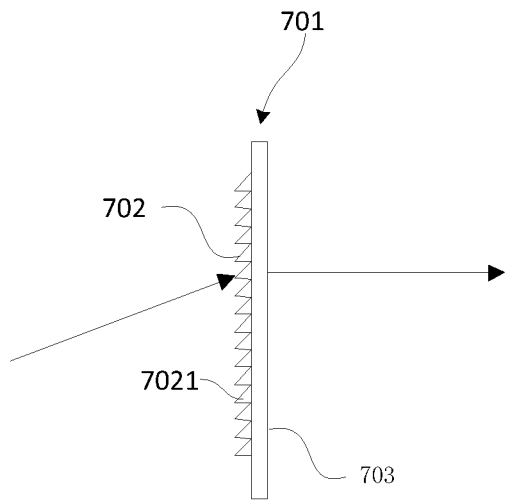
FIG. 7 is a schematic diagram showing a structure of an optical axis calibration element 701 according to an embodiment.

FIG. 7 is a schematic diagram showing a structure of an optical axis calibration element 701 in an embodiment. The optical axis calibration element 701 includes a first surface 702 and a second surface 703. A micro-structure 7021 is provided on the first surface 702 to change the direction of the second excitation light incident thereon, such that the second excitation light can be output from the second surface 703.

In an embodiment, the second surface 703 of the optical axis calibration element can be superimposed on and fixed to the scattering segment or the scattering element.

Sixteenth Part of Embodiments

In the light emitting devices shown in FIGS. 3, 4A1, 4B, 4E, 5A and 6, the wavelength conversion device and the filter wheel are independent from each other and are driven by two driving devices, respectively, to move periodically.

In an embodiment, the wavelength conversion device and the filter wheel are arranged coaxially and driven by a driving device to rotate about one rotation axis. The reflecting segment and the wavelength conversion segment of the wavelength conversion device form a first circular ring, and the scattering segment and the transmitting segment of the filter wheel form a second circular ring. A center of the first circular ring and a center of the second circular ring are both on the rotation axis. The reflecting segment and the scattering segment are arranged in two opposite sectors having equal central angles, and the wavelength conversion segment and the transmitting segment are arranged in two opposite sectors having equal central angles. A spot on the wavelength conversion device where the first excitation light is projected and spots on the filter wheel where the second excitation light and the excited light are projected, respectively, can be passed through by a same plane that passes through the rotation axis.

In an embodiment, the light incident surface of the wavelength conversion device and the light incident surface of the filter wheel are on the same plane. In another embodiment, the light incident surface of the wavelength conversion device and the light incident surface of the filter wheel are on another plane.

Figure 8:
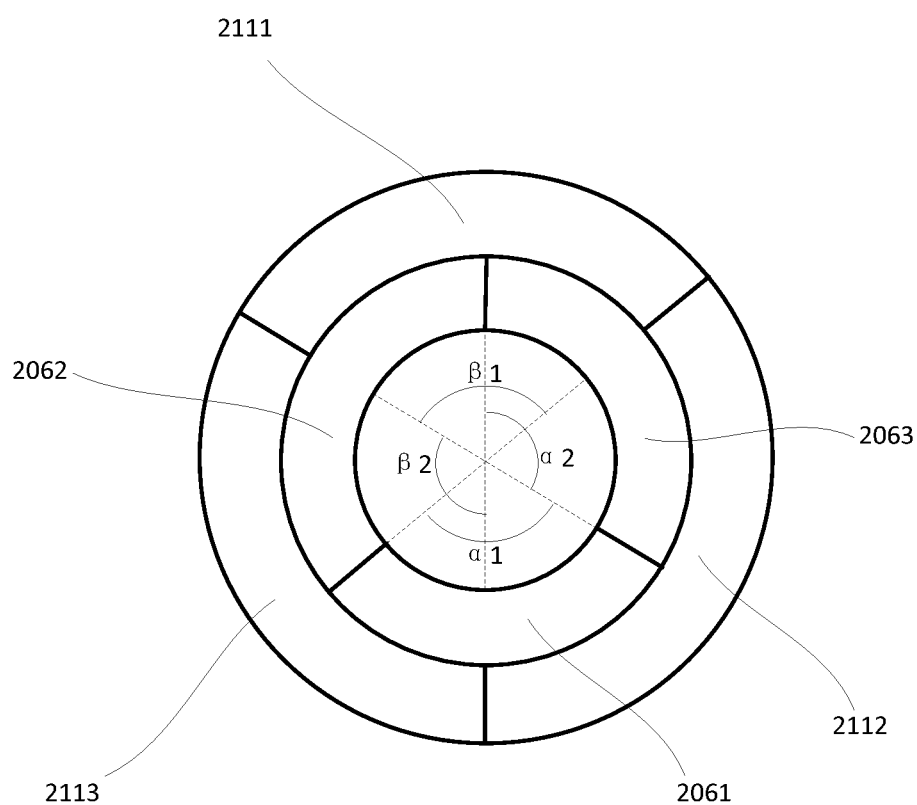
FIG. 8 is a schematic diagram showing a structure in which a wavelength conversion device 206 and a filter wheel 211 are arranged coaxially according to an embodiment.

FIG. 8 is a schematic diagram showing a structure in which the wavelength conversion device 206 and the filter wheel 211 are arranged coaxially according to an embodiment. As shown in FIG. 8, the wavelength conversion device 206 includes a reflecting segment 2061, a red light wavelength conversion segment 2062 and a green light wavelength conversion segment 2063, and the filter wheel 211 includes a scattering segment 2111, a red light transmitting segment 2112 and a green light transmitting segment 2113. The central angle α1 of the sector of the reflecting segment 2061 is opposite to and equal to the central angle β1 of the sector of the scattering segment 2111. The central angle α2 of the sector of the red light wavelength conversion segment 2062 is opposite to and equal to the central angle β2 of the sector of the red light transmitting segment 2112. Similarly, the central angle α3 (not shown) of the sector of the green light wavelength conversion segment 2063 is opposite to and equal to the central angle β3 (not shown) of the sector of the green light transmitting segment 2113.

Seventeenth Part of Embodiments

Each of the above embodiments includes a light homogenizing element. It can be understood by those skilled in the art that the light homogenizing element can be omitted from the light emitting device according to each of the above embodiments, which is also to be encompassed by the scope of the present disclosure. The second excitation light and the excited light output from the light emitting device enter the output light channel with a predetermined optical expansion.

Some of the above embodiments include a filter wheel. It can be understood by those skilled in the art that the filter wheel can be omitted from these embodiments, which is also to be encompassed by the scope of the present disclosure.

Some of the above embodiments include a scattering element. It can be appreciated by those skilled in the art that the filter wheel can be omitted from these embodiments, which is also to be encompassed by the scope of the present disclosure.

In each of the above parts of embodiments, the relay lens (the first relay lens or the second relay lens) may consist of one or more optical elements (e.g., convex lenses or concave lenses).

While in each of the above parts of embodiments, the specific number of relay lenses is described. However, the present disclosure is not limited thereto. The number of relay lenses may be increased or decreased by those skilled in the art as desired, which is also to be encompassed by the scope of the present disclosure.

In the embodiment shown in FIG. 3, the reflecting element 308 reflects the second excitation light and the excited light. The reflecting element 308 corresponds to an excitation light guider and an excited light guider superimposed. The excitation light guider has a characteristic of reflecting the second excitation light, and the excited light guider has a characteristic of reflecting the excited light and transmitting the second excitation light. The second excitation light is transmitted through the excited light guider and incident on the excitation light guider.

Similarly, the reflecting element 308 corresponds to an excitation light guider and an excited light guider superimposed. The excitation light guider has a characteristic of reflecting the second excitation light and transmitting the excited light, and the excited light guider has a characteristic of reflecting the excited light. The excited light is transmitted through the excitation light guider and incident on the excited light guider.

Here, the area of the reflection surface of the excited light guider can be comparable to the area of the reflection surface of the reflecting element 308. The area of the reflection surface of the excitation light guider can be equal to the area of the reflection surface of the reflecting element 308, or can be adapted to the size of the incident spot of the second excitation light it receives, such that the second excitation light can be received and reflected completely. In an embodiment, the optical expansion of each of the first excitation light and the second excitation light is smaller than the optical expansion of the excited light, and the area of the reflection surface of the excitation light guider can be smaller than the area of the reflection surface of the excited light guider.

In an embodiment shown in FIG. 4A1, the regional light splitter 404a includes a first region 404a1, a compensation-transmissive region 404a2, a third region 404a3 and a fourth region 404a4. The regional light splitter 404a corresponds to an excitation light guider and an excited light guider superimposed.

The excitation light guider and the excited light guider are superimposed in such a way that the second excitation light arrives first at the excitation light guider. The excitation light guider has a characteristic of reflecting the second excitation light and transmitting the excited light, and the excited light guider has a characteristic of reflecting the excited light and transmitting the excitation light (including the first excitation light and the second excitation light). The first excitation light is transmitted through the excited light guider except the superimposed region. The second excitation light is reflected by the excitation light guider and the excited light is reflected by the excited light guider. Here, the part of the excited light incident on the excitation light guider is transmitted through the excitation light guider.

Alternatively, the excitation light guider and the excited light guider are superimposed in such a way that the second excitation light arrives first at the excited light guider. The excitation light guider has a characteristic of reflecting the second excitation light, and the excited light guider has a characteristic of reflecting the excited light and transmitting the excitation light (including the first excitation light and the second excitation light). The first excitation light is transmitted through the excited light guider except the superimposed region. The second excitation light is transmitted through the excited light guider and reflected by the excitation light guider and the excited light is reflected by the excited light guider.

Here, the area of the excited light guider can be comparable to the area of the regional light splitter 404a. The area of the excitation light guider can be equal to the area of the first region 401a, or can be adapted to the size of the incident spot of the second excitation light it receives, such that the second excitation light can be received and reflected completely. Alternatively, the area of the excitation light guider can be larger than the size of the incident spot of the second excitation light, while the excitation light guider does not affect the transmission of the first excitation light (the transmission of the first excitation light would be blocked if the area of the excitation light guider is expanded indefinitely). In an embodiment, the optical expansion of each of the first excitation light and the second excitation light is smaller than the optical expansion of the excited light, and the area of the reflection surface of the excitation light guider can be smaller than the area of the reflection surface of the excited light guider.

Further, for the optical characteristics of the compensation-transmissive region 404a2, it is only required to arrange a region having the same optical characteristics as the compensation-transmissive region 404a2 at the corresponding position on the excited light guider. In the embodiments where the second light source 203 is omitted, it is not required to provide such region on the excited light guider.

For the same reason, each of the regional light splitter 404b in FIG. 4B and the regional light splitter 504 in FIG. 5A may correspond to an excitation light guider and an excited light guider superimposed. The excitation light guider has a characteristic of reflecting the excitation light (including the first excitation light and the second excitation light), and the excited light guider has a characteristic of reflecting the excited light. The excitation light guider and the excited light guider do not affect each other's guiding of the excitation light (including the first excitation light and the second excitation light) and the excited light. When the excitation light guider is in the light path of the excited light incident on the excited light guider, the excitation light guider transmits the excited light. When the excited light guider is in the light path of the excitation light (including the first excitation light and the second excitation light) incident on the excitation light guider, the excited light guider transmits the excitation light (including the first excitation light and the second excitation light).

Therefore, the light emitting devices according to the following embodiments are also to be encompassed by the scope of the present disclosure.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment and a wavelength conversion segment. The wavelength conversion device moves periodically such that the reflecting segment and the wavelength conversion segment are time-divisionally located in the light path of the first excitation light. The reflecting segment reflects the first excitation light to form second excitation light. The wavelength conversion segment is excited by the first excitation light to generate excited light. The light guiding system is further configured to collect the second excitation light and the excited light and guide the second excitation light and the excited light to exit via one output light channel. The first excitation light and the second excitation light have non-overlapping light paths. A primary optical axis of the second excitation light output from the wavelength conversion device does not coincide with a primary optical axis of the excited light output from the wavelength conversion device. The light guiding system includes a relay lens component, an excitation light guiding component and an excited light guiding component. The excitation light guiding component includes at least one excitation light guider. The excited light guiding component includes at least one excited light guider. The relay lens component is configured to collect the second excitation light and the excited light, such that the second excitation light and the excited light enter the output light channel with a predetermined optical expansion. The excitation light guider is configured to reflect the first excitation light or the second excitation light to change the light path of the first excitation light or the second excitation light. The excited light guider is configured to reflect the excited light to change the light path of the excited light, such that the primary optical axis of the second excitation light before entering the output light channel coincides with the primary optical axis of the excited light. Here, the excitation light guider does not change a light path of the excited light, and the excited light guider does not change the light paths of the first excitation light and the second excitation light.

One excitation light guider reflects only one of the first excitation light and the second excitation light. In an embodiment, the excitation light guiding component includes an excitation light guider for reflecting the second excitation light. In another embodiment, the excitation light guiding component includes an excitation light guider for reflecting the second excitation light and an excitation light guider for reflecting the first excitation light.

In the present disclosure, the first excitation light and the second excitation light having non-overlapping light paths may mean that the first excitation light and the second excitation light do not have any of the following features.

1. The primary optical axis of the first excitation light in at least one segment of its light path and the primary optical axis of the second excitation light in at least one segment of its light path coincide and have opposite directions. In the present disclosure, a path a light beam passes with its direction maintained unchanged can be considered as a light path segment.

Figure 9:
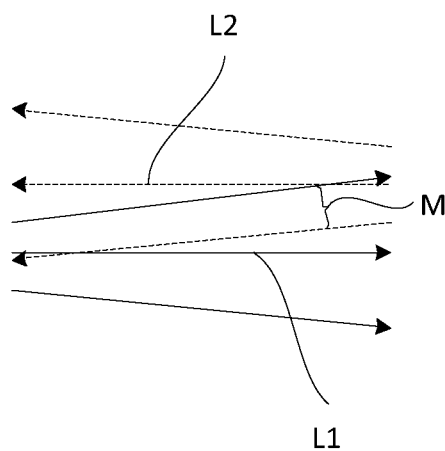
FIG. 9 is a schematic diagram showing that a primary optical axis of first excitation light and a primary optical axis of second excitation light are parallel and in opposite directions and the first excitation light and the second excitation light overlap at least partially.

2. The primary optical axis of the first excitation light in at least one segment A of its light path and the primary optical axis of the second excitation light in at least one segment of its light path are parallel with each other and have opposite directions, and at least a part of the first excitation light in the segment A and at least a part of the second excitation light in the segment B overlap. As shown in FIG. 9, the first excitation light is shown in a solid line and the second excitation light is shown in a dashed line. The primary optical axis L1 of the first excitation light and the primary optical axis L2 of the second excitation light are parallel with each other and have opposite directions, and the first excitation light and the second excitation light have an overlapping part M. For the excitation light guider that is not in the light path of the excited light, the present disclosure is not limited to its transmission characteristic for the excited light, i.e., it may have a characteristic of transmitting or reflecting the excited light.

For the excited light guider that is not in the light path of any of the first excitation light and the second excitation light, the present disclosure is not limited to its transmission characteristic for the first excitation light and the second excitation light, i.e., it may have a characteristic of transmitting or reflecting the first excitation light and the second excitation light.

For the excited light guider in the light path of at least one of the first excitation light and the second excitation light, except the region for receiving the first excitation light or the second excitation light (which region transmits the received first excitation light or the second excitation light), the present disclosure is not limited to the transmission characteristic of the remaining region of the excited light guider for the first excitation light and the second excitation light, i.e., the remaining region may have a characteristic of transmitting or reflecting the first excitation light and the second excitation light.

In an embodiment, the excitation light guider has a reflection surface whose area satisfies a condition that the area is sufficiently large such that the reflection surface of the excitation light guider can receive and reflect the first excitation light or the second excitation light completely at a specified position, while not affecting transmission of the first excitation light and the second excitation light in other light path segments. A path a light beam passes with its direction maintained unchanged can be considered as a light path segment. For example, as shown in FIG. 2C, the path the second excitation light passes when it is transmitted from the collection lens 205 to the excitation light guider 209c2 can be a light path segment of the second excitation light, the path the second excitation light passes when it is transmitted from the excitation light guider 209c2 to the excitation light guider 209c3 can be a light path segment of the second excitation light, and so on. The other light path segments as described above can be considered as light path segments that do not start or end with the excitation light guider.

In an embodiment, the excitation light guiding component further includes at least one excitation light guider satisfying a first condition that the excitation light guider is in the light path of the second excitation light, located at a position where the primary optical axis of the second excitation light it receives and a straight line of a primary optical axis of the excited light as reflected by one excited light guider converge, and configured to reflect the second excitation light it receives, such that the primary optical axis of the second excitation light and the primary optical axis of the excited light coincide. For example, as shown in FIG. 2A, the excitation light guider 209a is located at a position where the primary optical axis of the second excitation light it receives and a straight line of a primary optical axis of the excited light as reflected by the excited light guider 204a converge, and is configured to reflect the second excitation light it receives, such that the primary optical axis of the second excitation light and the primary optical axis of the excited light coincide.

In an embodiment, in addition to the excitation light guider satisfying the first condition, the excitation light guiding component further includes at least one excitation light guider satisfying a condition that the excitation light guider is configured to reflect the second excitation light it receives, such that the primary optical axis of the second excitation light and a primary optical axis of the excited light as reflected by one excited light guider have a convergence position.

In an embodiment, in addition to the excitation light guider satisfying the first condition and the excited light guider, the excitation light guiding component further includes at least one excitation light guider and the excited light guiding component further includes at least one excited light guider. The excitation light guider and the excited light guider are arranged in a superimposed manner. For example, as shown in FIG. 3, the excitation light guider 209a and the excited light guider 204a satisfy the first condition, and the reflecting element 308 corresponds to an excitation light guider and an excited light guider superimposed.

In an embodiment, the excitation light guider and the excited light guider arranged in the superimposed manner are replaced with a one-piece regional light splitter including at least a first region and optionally a second region. The first region has a characteristic of reflecting the first excitation light and the second excitation light, and the second region has a characteristic of reflecting the excited light. The first region corresponds to the superimposed part of the excitation light guider and the excited light guider, and the second region corresponds to the non-superimposed region of the excited light guider. If the entire region of the excited light guider is superimposed on the excitation light guider, the regional light splitter may include only the first region.

For example, in FIG. 3, the reflecting element 308 provides the function of reflecting the excited light and the second excitation light, and the reflecting element 308 corresponds to a first region for reflecting the excited light and the second excitation light. For example, in FIG. 4A1, without the compensation light and the compensation-transmissive region 404a2 (the compensation-transmissive region 404a2 is replaced with the fourth region 404a4), the regional light splitter 404a corresponds to a first region (corresponding to the third region 404a3) for reflecting the excited light and the second excitation light, and a second region (corresponding to the first region 404a1 and fourth region 404a4) for reflecting the excited light.

In an embodiment, the first region has a reflection surface whose area satisfies a condition that the area is sufficiently large such that the reflection surface of the first region can receive and reflect the first excitation light or the second excitation light completely at a specified position, while not affecting transmission of the first excitation light and the second excitation light in other light path segments. In an embodiment, the area of the reflection surface of the first region can be adapted to the size of the spot on which the first or second excitation light it receives is projected on it, i.e., the area can match the spot, e.g., equal to the area of the spot, such that the first or second excitation light can be reflected completely.

In an embodiment, in addition to the excitation light guider satisfying the first condition and the excited light guider, the excitation light guiding component further includes at least one excitation light guider and the excited light guiding component further includes at least one excited light guider. The excitation light guider and the excited light guider satisfy: a second condition that the excitation light guider is in a light path of the excited light as reflected by one excited light guider and a distance between the primary optical axis of the second excitation light received by the excitation light guider and the primary optical axis of the excited light received by the excited light guider is larger than a distance between the primary optical axis of the second excitation light reflected by the excitation light guider and the primary optical axis of the excited light reflected by the excited light guider, or a third condition that the excitation light guider is in a reverse extension path of a light path of the excited light as reflected by one excited light guider and a distance between the primary optical axis of the second excitation light received by the excitation light guider and the primary optical axis of the excited light received by the excited light guider is larger than a distance between the primary optical axis of the second excitation light reflected by the excitation light guider and the primary optical axis of the excited light reflected by the excited light guider. For example, as shown in FIG. 4E, the excitation light guider 409e2 and the excited light guider 408b satisfy the first condition, and the excitation light guider 409e1 and the excited light guider 204b satisfy the third condition.

In an embodiment, the wavelength conversion segment is a reflective wavelength conversion segment and the excited light and the second excitation light are output from one side of the wavelength conversion device. The excitation light guider corresponds, one to one, to the excited light guider. The excitation light guider and the corresponding excited light guider are parallel with each other and have their respective reflection surfaces facing a same direction. For example, as shown in FIG. 2A, the excitation light guider 209a corresponds to the excited light guider 204a, and their reflection surfaces face the same direction. For example, as shown in FIG. 4A1, the excitation light guider 409a corresponds to the excited light guider 408a, and their reflection surfaces face the same direction. The regional light splitter 404a corresponds to an excitation light guider and an excited light guider superimposed and their reflection surfaces face the same direction.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment and a wavelength conversion segment. The wavelength conversion device moves periodically such that the reflecting segment and the wavelength conversion segment are time-divisionally located in the light path of the first excitation light. The reflecting segment reflects the first excitation light to form second excitation light. The wavelength conversion segment is excited by the first excitation light to generate excited light. The light guiding system is further configured to collect the second excitation light and the excited light and guide the second excitation light and the excited light to exit via one output light channel. The first excitation light and the second excitation light have non-overlapping light paths. A primary optical axis of the second excitation light output from the wavelength conversion device does not coincide with a primary optical axis of the excited light output from the wavelength conversion device. The light guiding system includes a relay lens component, an excitation light guiding component, an optical axis calibration element and an excited light guiding component. The excitation light guiding component includes at least one excitation light guider. The excited light guiding component includes at least one excited light guider. The relay lens component is configured to collect the second excitation light and the excited light, such that the second excitation light and the excited light enter the output light channel with a predetermined optical expansion. The excitation light guider is configured to reflect the first excitation light or the second excitation light and the optical axis calibration element is configured to transmit the second excitation light and calibrate the optical axis of the second excitation light. The excited light guider is configured to reflect the excited light, such that the primary optical axis of the second excitation light before entering the output light channel coincides with the primary optical axis of the excited light. Here, the excitation light guider does not change a light path of the excited light. The optical axis calibration element is not in the light path of the excited light. The excited light guider does not change the light paths of the first excitation light and the second excitation light.

The excited light guider can be omitted in the light emitting device according to the above embodiments, which is also to be encompassed by the scope of the present disclosure. For example, the light emitting device shown in FIG. 2C does not include an excited light guider.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment and a wavelength conversion segment. The wavelength conversion device moves periodically such that the reflecting segment and the wavelength conversion segment are time-divisionally located in the light path of the first excitation light. The reflecting segment reflects the first excitation light to form second excitation light. The wavelength conversion segment is excited by the first excitation light to generate excited light. The light guiding system is further configured to collect the second excitation light and the excited light and guide the second excitation light and the excited light to exit via one output light channel. The first excitation light and the second excitation light have non-overlapping light paths. A primary optical axis of the second excitation light output from the wavelength conversion device does not coincide with a primary optical axis of the excited light output from the wavelength conversion device. The light guiding system includes a relay lens component and an excitation light guiding component. The excitation light guiding component includes at least one excitation light guider. The relay lens component is configured to collect the second excitation light and the excited light, such that the second excitation light and the excited light enter the output light channel with a predetermined optical expansion. The excitation light guider is configured to reflect the first excitation light or the second excitation light to change the light path of the first excitation light or the second excitation light, such that the primary optical axis of the second excitation light before entering the output light channel coincides with the primary optical axis of the excited light. Here, the excitation light guider does not change a light path of the excited light.

In an embodiment, the excitation light guiding component includes at least one excitation light guider satisfying a condition that the excitation light guider is in the light path of the second excitation light, located at a position where the primary optical axis of the second excitation light it receives and a straight line of a primary optical axis of a segment of the light path of the excited light converge, and configured to reflect the second excitation light it receives, such that the primary optical axis of the second excitation light and the primary optical axis of the segment of the light path of the excited light are parallel with each other and have the distance therebetween smaller than a threshold.

In an embodiment, the excitation light guiding component further includes at least one excitation light guider satisfying a condition that the excitation light guider is configured to reflect the second excitation light it receives, such that the primary optical axis of the second excitation light and the primary optical axis of the excited light have a convergence position.

In an embodiment, the excitation light guiding component further includes at least one excitation light guider satisfying a condition that the excitation light guider changes a direction of the primary optical axis of the second excitation light, so as to reduce a minimum distance between the primary optical axis of the second excitation light and the primary optical axis of the excited light.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment and a wavelength conversion segment. The wavelength conversion device moves periodically such that the reflecting segment and the wavelength conversion segment are time-divisionally located in the light path of the first excitation light. The reflecting segment reflects the first excitation light to form second excitation light. The wavelength conversion segment is excited by the first excitation light to generate excited light. The light guiding system is further configured to collect the second excitation light and the excited light and guide the second excitation light and the excited light to exit via one output light channel. The first excitation light and the second excitation light have non-overlapping light paths. A primary optical axis of the second excitation light output from the wavelength conversion device does not coincide with a primary optical axis of the excited light output from the wavelength conversion device. The light guiding system includes a relay lens component, an excitation light guiding component and an optical axis calibration element. The excitation light guiding component includes at least one excitation light guider. The relay lens component is configured to collect the second excitation light and the excited light, such that the second excitation light and the excited light enter the output light channel with a predetermined optical expansion. The excitation light guider is configured to reflect the first excitation light or the second excitation light and the optical axis calibration element is configured to transmit the second excitation light and calibrate the optical axis of the second excitation light, such that the primary optical axis of the second excitation light before entering the output light channel coincides with the primary optical axis of the excited light. Here, the excitation light guider does not change a light path of the excited light. The optical axis calibration element is not in the light path of the excited light.

The present disclosure is not limited to the composition of the light guiding system as described in the above embodiments. The light emitting device according to the following embodiments are to be encompassed by the scope of the present disclosure.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment and a wavelength conversion segment. The wavelength conversion device moves periodically such that the reflecting segment and the wavelength conversion segment are time-divisionally located in the light path of the first excitation light. The reflecting segment reflects the first excitation light to form second excitation light. The wavelength conversion segment is excited by the first excitation light to generate excited light. A primary optical axis of the second excitation light output from the wavelength conversion device does not coincide with a primary optical axis of the excited light output from the wavelength conversion device. The light guiding system is further configured to collect the second excitation light and the excited light, guide the second excitation light and the excited light to exit via one output light channel, and cause the primary optical axis of the second excitation light to coincide with the primary optical axis of the excited light. The first excitation light and the second excitation light have non-overlapping light paths.

The present disclosure is not limited to the embodiment in which the light guiding system causes the primary optical axis of the second excitation light to coincide with the primary optical axis of the excited light. On one hand, the primary optical axes of the second excitation light and the excited light entering the output light channel may not coincide. On the other hand, the primary optical axis of the second excitation light output from the reflecting segment of the wavelength conversion device may already coincide with the primary optical axis of the excited light output from the wavelength conversion segment of the wavelength conversion device. Thus, there is no need for the light guiding system to cause them to coincide. Hence, the following embodiments are to be encompassed by the scope of the present disclosure.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment and a wavelength conversion segment. The wavelength conversion device moves periodically such that the reflecting segment and the wavelength conversion segment are time-divisionally located in the light path of the first excitation light. The reflecting segment reflects the first excitation light to form second excitation light. The wavelength conversion segment is excited by the first excitation light to generate excited light. The light guiding system is further configured to collect the second excitation light and the excited light and guide the second excitation light and the excited light to exit via one output light channel. The first excitation light and the second excitation light have non-overlapping light paths.

The present disclosure is not limited to the embodiment in which the light guiding system guides the second excitation light and the excited light to exit via one output light channel. In other embodiments, the light guiding system can guide the second excitation light and the excited light to exit via different output light channels, so as to be provided to different spatial optical modulators for image modulations. Hence, the following embodiments are to be encompassed by the scope of the present disclosure.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment configured to reflect the first excitation light to form second excitation light. The light guiding system is further configured to collect the second excitation light and guide the second excitation light to exit via an output light channel. The first excitation light and the second excitation light have non-overlapping light paths. Based on this embodiment, in an embodiment, the wavelength conversion device further includes a wavelength conversion segment and the wavelength conversion device moves periodically such that the reflecting segment and the wavelength conversion segment are time-divisionally located in the light path of the first excitation light. The wavelength conversion segment is excited by the first excitation light to generate excited light.

In some of the above embodiments, the first light source is configured to emit the first excitation light and the second light source is configured to emit the compensation light. In an embodiment, the following modifications can be made to the above parts of embodiments. The first light source can be configured to emit primary color light (which can be used for image modulation) and the second light source 203 can be configured to emit excitation light. The wavelength conversion device moves periodically, and the first light source and the second light source are turned on and off in accordance with the periodic movement of the wavelength conversion device, such that the reflecting segment of the wavelength conversion device is in a light path of the primary color light when the first light source is emitting the primary color light so as to reflect the primary color light and that the wavelength conversion segment of the wavelength conversion device is in a light path of the excitation light when the second light source is emitting the excitation light so as to generate the excited light. In an embodiment, the primary color light can be complementary light to the excited light. The excited light and its complementary light can be combined into white light.

In an embodiment, the excitation light can be ultraviolet light. The excited light generated by the wavelength conversion segment of the wavelength conversion device can be one or two, or a mix of any two, of red light, green light and blue light. For example, the excited light can be red light and green light, and the primary color light is blue light. Alternatively, the excited light can be yellow light, and the primary color light is blue light. Alternatively, the excited light can be blue light, and the primary color light is yellow light. In another embodiment, the excitation light can be blue light (e.g., blue laser light or blue LED light). The excited light generated by the wavelength conversion segment of the wavelength conversion device can be one or two of red light, green light and yellow light. For example, the excited light can be red light and green light, and the primary color light is blue light. Alternatively, the excited light can be green light and yellow light, and the primary color light is blue light.

In this embodiment, before the primary color light enters the wavelength conversion device, the light guiding system guides the primary color light in the same way it guides the first excitation light (referring to the description of the first excitation light in the above parts of embodiments). After the primary color light is output from the wavelength conversion device, the light guiding system guides the primary color light in the same way it guides the second excitation light (referring to the description of the second excitation light in the above parts of embodiments). The light transmission paths and optical processes of the excited light in this embodiment can be the same as those in the above parts of embodiments and details thereof will be omitted here.

It can be appreciated by those skilled in the art that the following embodiments are also to be encompassed by the scope of the present disclosure.

In an embodiment, a light emitting device is provided. The light emitting device includes a first light source, a light guiding system and a wavelength conversion device. The first light source is configured to emit first excitation light which enters the light guiding system via an incident light channel. The light guiding system is configured to guide the first excitation light to the wavelength conversion device. The wavelength conversion device includes a reflecting segment configured to reflect the first excitation light to form second excitation light. The light guiding system is further configured to collect the second excitation light and guide the second excitation light to exit via an output light channel. The first excitation light and the second excitation light have non-overlapping light paths. The light guiding system includes an excitation light guiding component which includes at least one excitation light guider. The excitation light guider is configured to reflect the first excitation light or the second excitation light to change the light path of the first excitation light or the second excitation light, such that the light path of the first excitation light and the light path of the second excitation light do not overlap.

In an embodiment, the light guiding system further includes a relay lens component configured to collect the second excitation light, such that the second excitation light enters the output light channel with a predetermined optical expansion.

In an embodiment, the relay lens component is further configured to collect the first excitation light, such that the second excitation light is projected to the wavelength conversion device with a predetermined spot size.

In an embodiment, the light guiding system further includes at least one optical axis calibration element configured to transmit the second excitation light and change a direction of the primary optical axis of the second excitation light. With the combined effect of the excitation light guiding component and the optical axis calibration element, the light path of the first excitation light and the light path of the second excitation light do not overlap.

A projection system is also provided by the present disclosure. The projection system includes the light emitting device according to any of the above embodiments.

The embodiments of the present disclosure have been described above, to enable those skilled in the art to implement or use the present disclosure. Various modifications to these embodiment would be apparent to those skilled in the art. The general principles of the present disclosure can be implemented in other embodiments without departing from the spirit and scope of the present disclosure. Hence, the present disclosure is not limited to the embodiments described above. Rather, the present disclosure is to cover the broadest scope that conforms to the principles and novel features disclosed herein.

What is claimed is:

1. A light emitting device comprising:
 a first light source;
 a light guiding system; and
 a wavelength conversion device;
 wherein:
  the first light source is configured to emit first excitation light which enters the light guiding system via an incident light channel,
  the light guiding system is configured to guide the first excitation light to the wavelength conversion device,
  the wavelength conversion device comprises a wavelength conversion segment and a reflecting segment that reflects the first excitation light to form second excitation light, the wavelength conversion device moves periodically such that the reflecting segment and the wavelength conversion segment are time-divisionally located in a light path of the first excitation light, and the wavelength conversion segment is excited by the first excitation light to generate excited light,
  the light guiding system is further configured to collect the second excitation light and guide the second excitation light to exit via an output light channel, and is further configured to collect the excited light and guide the excited light to exit via the output light channel,
  the first excitation light and the second excitation light have non-overlapping light paths,
  a primary optical axis of the second excitation light output from the wavelength conversion device does not coincide with a primary optical axis of the excited light output from the wavelength conversion device, and
  the light guiding system is further configured to cause the primary optical axis of the second excitation light and the primary optical axis of the excited light to be parallel with each other and have a distance therebetween smaller than a threshold.

2. The light emitting device according to claim 1, wherein:
 the light guiding system comprises an excitation light guiding component comprising at least one excitation light guider,
 the excitation light guider is configured to reflect the first excitation light or the second excitation light to change the light path of the first excitation light or the second excitation light, such that the primary optical axis of the second excitation light before entering the output light channel and the primary optical axis of the excited light are parallel with each other and have the distance therebetween smaller than the threshold, and
 the excitation light guider does not change a light path of the excited light.

3. The light emitting device according to claim 2, wherein:
 the light guiding system further comprises an excited light guiding component comprising at least one excited light guider,
 the excitation light guider is configured to reflect the first excitation light or the second excitation light to change the light path of the first excitation light or the second excitation light and the excited light guider is configured to reflect the excited light to change the light path of the excited light, such that the primary optical axis of the second excitation light before entering the output light channel and the primary optical axis of the excited light are parallel with each other and have the distance therebetween smaller than the threshold, and
 the excited light guider does not change the light paths of the first excitation light and the second excitation light.

4. The light emitting device according to claim 2, wherein:
 the excitation light guiding component comprises at least one excitation light guider satisfying a condition that the excitation light guider is in the light path of the second excitation light, located at a position where the primary optical axis of the second excitation light it receives and a straight line of a primary optical axis of a segment of the light path of the excited light converge, and configured to reflect the second excitation light it receives, such that the primary optical axis of the second excitation light and the primary optical axis of the segment of the light path of the excited light are parallel with each other and have the distance therebetween smaller than the threshold.

5. The light emitting device according to claim 4, wherein:
 the excitation light guiding component further comprises at least one excitation light guider satisfying a condition that the excitation light guider is configured to reflect the second excitation light it receives, such that the primary optical axis of the second excitation light and the primary optical axis of the excited light have a convergence position.

6. The light emitting device according to claim 3, wherein:
 the excitation light guiding component further comprises at least one excitation light guider satisfying a first condition that the excitation light guider is in the light path of the second excitation light, located at a position where the primary optical axis of the second excitation light it receives and a straight line of a primary optical axis of the excited light as reflected by one excited light guider converge, and configured to reflect the second excitation light it receives, such that the primary optical axis of the second excitation light and the primary optical axis of the excited light are parallel with each other and have the distance therebetween smaller than the threshold.

7. The light emitting device according to claim 6, wherein, in addition to the excitation light guider satisfying the first condition, the excitation light guiding component further comprises at least one excitation light guider satisfying a condition that the excitation light guider is configured to reflect the second excitation light it receives, such that the primary optical axis of the second excitation light and a primary optical axis of the excited light as reflected by one excited light guider have a convergence position.

8. The light emitting device according to claim 6, wherein, in addition to the excitation light guider satisfying the first condition and the excited light guider, the excitation light guiding component further comprises at least one excitation light guider and the excited light guiding component further comprises at least one excited light guider, the excitation light guider and the excited light guider being arranged in a superimposed manner.

9. The light emitting device according to claim 8, wherein:

the excitation light guider and the excited light guider arranged in the superimposed manner are replaced with a one-piece regional light splitter comprising at least a first region and optionally a second region, and the first region has a characteristic of reflecting the first excitation light and the second excitation light, and the second region has a characteristic of reflecting the excited light.

10. The light emitting device according to claim 2, wherein the excitation light guider has a reflection surface whose area satisfies a condition that the area is sufficiently large such that the reflection surface of the excitation light guider can receive and reflect the first excitation light or the second excitation light completely at a specified position, while not affecting transmission of the first excitation light and the second excitation light in other light path segments.

11. The light emitting device according to claim 9, wherein the first region has a reflection surface whose area satisfies a condition that the area is sufficiently large such that the reflection surface of the first region can receive and reflect the first excitation light or the second excitation light completely at a specified position, while not affecting transmission of the first excitation light and the second excitation light in other light path segments.

12. The light emitting device according to claim 4, wherein the excitation light guiding component further comprises at least one excitation light guider satisfying a condition that the excitation light guider changes a direction of the primary optical axis of the second excitation light, so as to reduce a minimum distance between the primary optical axis of the second excitation light and the primary optical axis of the excited light.

13. The light emitting device according to claim 6, wherein, in addition to the excitation light guider satisfying the first condition and the excited light guider, the excitation light guiding component further comprises at least one excitation light guider and the excited light guiding component further comprises at least one excited light guider, the excitation light guider and the excited light guider satisfying:
  a second condition that the excitation light guider is in a light path of the excited light as reflected by one excited light guider and a distance between the primary optical axis of the second excitation light received by the excitation light guider and the primary optical axis of the excited light received by the excited light guider is larger than a distance between the primary optical axis of the second excitation light reflected by the excitation light guider and the primary optical axis of the excited light reflected by the excited light guider, or
  a third condition that the excitation light guider is located in a reverse extension path of the light path of the excited light as reflected by one excited light guider and the distance between the primary optical axis of the second excitation light received by the excitation light guider and the primary optical axis of the excited light received by the excited light guider is larger than the distance between the primary optical axis of the second excitation light reflected by the excitation light guider and the primary optical axis of the excited light reflected by the excited light guider.

14. A light emitting device comprising:
a first light source;
a light guiding system; and
a wavelength conversion device;
wherein:

the first light source is configured to emit first excitation light which enters the light guiding system via an incident light channel, the light guiding system is configured to guide the first excitation light to the wavelength conversion device, the wavelength conversion device comprises a reflecting segment that reflects the first excitation light to form second excitation light, the light guiding system is further configured to collect the second excitation light and guide the second excitation light to exit via an output light channel, the first excitation light and the second excitation light have non-overlapping light paths, the light guiding system comprises an excitation light guiding component comprising at least one excitation light guider, the excitation light guider is configured to reflect the first excitation light or the second excitation light to change the light path of the first excitation light or the second excitation light, such that a primary optical axis of the second excitation light before entering the output light channel and a primary optical axis of excited light are parallel with each other and have a distance therebetween smaller than a threshold, and the excitation light guider does not change a light path of the excited light.

15. The light emitting device according to claim 14, wherein the light guiding system further comprises a relay lens component, wherein the relay lens component is configured to collect the second excitation light and the excited light, such that the second excitation light and the excited light enter the output light channel with a predetermined optical expansion.

16. A light emitting device comprising:
a first light source;
a light guiding system;
a second light source; and
a wavelength conversion device;
wherein:

the first light source is configured to emit first excitation light which enters the light guiding system via an incident light channel and then is guided to the wavelength conversion device by the light guiding system, the wavelength conversion device comprises a wavelength conversion segment and a reflecting segment and moves periodically such that the reflecting segment and the wavelength conversion segment are time-divisionally located in a light path of the first excitation light, the wavelength conversion segment is excited by the first excitation light to generate excited light, and the reflecting segment reflects the first excitation light to form second excitation light, the second light source is configured to emit compensation light when the wavelength conversion segment is in the light path of the first excitation light, and the compensation light is scattered by the wavelength conversion segment and then output from the wavelength conversion device along with excited light, the light guiding system comprises an excitation light guiding component and an excited light guiding component, the excited light guiding component is configured to guide the first excitation light to the wavelength conversion device and guide the excited light and the compensation light to an output light channel, the excitation light guiding component is configured to guide the second excitation light to the output light channel, in such a manner that a primary optical axis of the second excitation light coincides with primary optical axes of the excited light and the compensation light guided by the excited light guiding component, and the first excitation light and the second excitation light have non-overlapping light paths.

17. The light emitting device according to claim 16, further comprising:
a filter wheel comprising a scattering segment and a transmitting segment;
wherein:
the scattering segment is configured to scatter the second excitation light, in such a manner that a scattering angle of the second excitation light is maintained consistent with a scattering angle of the excited light, and
the transmitting segment is configured to transmit the excited light.

18. The light emitting device according to claim 16, wherein:
a primary optical axis of the second excitation light output from the wavelength conversion device does not coincide with a primary optical axis of the excited light output from the wavelength conversion device, and
the light guiding system is further configured to cause the primary optical axis of the second excitation light and the primary optical axis of the excited light to be parallel with each other and have a distance therebetween smaller than a threshold.

19. The light emitting device according to claim 18, wherein:
the light guiding system further comprises a relay lens component,
the excitation light guiding component comprises at least one excitation light guider,
the relay lens component is configured to collect the second excitation light, the compensation light and the excited light, in such a manner that the second excitation light, the compensation light and the excited light enter the output light channel with a predetermined optical expansion,
the excitation light guider is configured to reflect the first excitation light or the second excitation light to change the light path of the first excitation light or the second excitation light, such that the primary optical axis of the second excitation light before entering the output light channel and the primary optical axis of the excited light are parallel with each other and have the distance therebetween smaller than the threshold, and
the excitation light guider does not change a light path of the excited light.

20. The light emitting device according to claim 19, wherein:
the excited light guiding component comprises at least one excited light guider,
the excitation light guider is configured to reflect the first excitation light or the second excitation light to change the light path of the first excitation light or the second excitation light and the excited light guider is configured to reflect the excited light to change the light path of the excited light, such that the primary optical axis of the second excitation light before entering the output light channel and the primary optical axis of the excited light are parallel with each other and have the distance therebetween smaller than the threshold, and
the excited light guider does not change the light paths of the first excitation light and the second excitation light.

21. The light emitting device according to claim 19, wherein:
the excitation light guiding component comprises at least one excitation light guider satisfying a condition that the excitation light guider is in the light path of the second excitation light, located at a position where the primary optical axis of the second excitation light it receives and a straight line of a primary optical axis of a segment of the light path of the excited light converge, and configured to reflect the second excitation light it receives, such that the primary optical axis of the second excitation light and the primary optical axis of the segment of the light path of the excited light are parallel with each other and have the distance therebetween smaller than the threshold.

22. The light emitting device according to claim 21, wherein:
the excitation light guiding component further comprises at least one excitation light guider satisfying a condition that the excitation light guider is configured to reflect the second excitation light it receives, such that the primary optical axis of the second excitation light and the primary optical axis of the excited light have a convergence position.

23. The light emitting device according to claim 20, wherein:
the excitation light guiding component further comprises at least one excitation light guider satisfying a first condition that the excitation light guider is in the light path of the second excitation light, located at a position where the primary optical axis of the second excitation light it receives and a straight line of a primary optical axis of the excited light as reflected by one excited light guider converge, and configured to reflect the second excitation light it receives, such that the primary optical axis of the second excitation light and the primary optical axis of the excited light are parallel with each other and have the distance therebetween smaller than the threshold.

24. The light emitting device according to claim 23, wherein, in addition to the excitation light guider satisfying the first condition, the excitation light guiding component further comprises at least one excitation light guider satisfying a condition that the excitation light guider is configured to reflect the second excitation light it receives, such that the primary optical axis of the second excitation light and a primary optical axis of the excited light as reflected by one excited light guider have a convergence position.

25. The light emitting device according to claim 23, wherein, in addition to the excitation light guider satisfying the first condition and the excited light guider, the excitation light guiding component further comprises at least one excitation light guider and the excited light guiding component further comprises at least one excited light guider, the excitation light guider and the excited light guider being arranged in a superimposed manner.

26. The light emitting device according to claim 25, wherein:
the excitation light guider and the excited light guider arranged in the superimposed manner are replaced with a one-piece regional light splitter comprising at least a first region and optionally a second region, and the first region has a characteristic of reflecting the first excitation light and the second excitation light, and the second region has a characteristic of reflecting the excited light.

27. The light emitting device according to claim 19, wherein the excitation light guider has a reflection surface whose area satisfies a condition that the area is sufficiently large such that the reflection surface of the excitation light guider can receive and reflect the first excitation light or the second excitation light completely at a specified position, while not affecting transmission of the first excitation light and the second excitation light in other light path segments.

28. The light emitting device according to claim 26, wherein the first region has a reflection surface whose area satisfies a condition that the area is sufficiently large such that the reflection surface of the first region can receive and reflect the first excitation light or the second excitation light completely at a specified position, while not affecting transmission of the first excitation light and the second excitation light in other light path segments.

29. The light emitting device according to claim 21, wherein the excitation light guiding component further comprises at least one excitation light guider satisfying a condition that the excitation light guider changes a direction of the primary optical axis of the second excitation light, so as to reduce a minimum distance between the primary optical axis of the second excitation light and the primary optical axis of the excited light.

30. The light emitting device according to claim 23, wherein, in addition to the excitation light guider satisfying the first condition and the excited light guider, the excitation light guiding component further comprises at least one excitation light guider and the excited light guiding component further comprises at least one excited light guider, the excitation light guider and the excited light guider satisfying:

a second condition that the excitation light guider is in a light path of the excited light as reflected by one excited light guider and a distance between the primary optical axis of the second excitation light received by the excitation light guider and the primary optical axis of the excited light received by the excited light guider is larger than a distance between the primary optical axis of the second excitation light reflected by the excitation light guider and the primary optical axis of the excited light reflected by the excited light guider, or a third condition that the excitation light guider is located in a reverse extension path of the light path of the excited light as reflected by one excited light guider and the distance between the primary optical axis of the second excitation light received by the excitation light guider and the primary optical axis of the excited light received by the excited light guider is larger than the distance between the primary optical axis of the second excitation light reflected by the excitation light guider and the primary optical axis of the excited light reflected by the excited light guider.

\* \* \* \* \*